US011036739B1

United States Patent
Adams et al.

(10) Patent No.: US 11,036,739 B1
(45) Date of Patent: *Jun. 15, 2021

(54) PERFORMING GEOSPATIAL-FUNCTION JOIN USING SINGLE INTERVAL JOIN

(71) Applicant: Snowflake Inc., San Mateo, CA (US)

(72) Inventors: Matthias Carl Adams, Berlin (DE); Simon Holm Jensen, Menlo Park, CA (US); Spyridon Triantafyllis, San Mateo, CA (US)

(73) Assignee: Snowflake Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/944,049

(22) Filed: Jul. 30, 2020

Related U.S. Application Data

(63) Continuation of application No. 16/941,236, filed on Jul. 28, 2020, which is a continuation of application No. 16/920,143, filed on Jul. 2, 2020.

(60) Provisional application No. 63/030,872, filed on May 27, 2020.

(51) Int. Cl.
| | |
|---|---|
| *G06F 16/00* | (2019.01) |
| *G06F 7/00* | (2006.01) |
| *G06F 16/2453* | (2019.01) |

(52) U.S. Cl.
CPC .. *G06F 16/24544* (2019.01); *G06F 16/24537* (2019.01)

(58) Field of Classification Search
CPC .. G06F 16/2246; G06F 16/2456; G06F 16/29; G06F 16/24537; G06F 16/24544

USPC .......................................................... 707/714
See application file for complete search history.

(56) References Cited

U.S. PATENT DOCUMENTS

| | | | |
|---|---|---|---|
| 2005/0210023 A1* | 9/2005 | Barrera | G06F 16/24537 |
| 2011/0161328 A1 | 6/2011 | Park et al. | |
| 2014/0297585 A1* | 10/2014 | Chawda | G06F 16/278 |
| | | | 707/610 |
| 2015/0178352 A1 | 6/2015 | Yuan et al. | |
| 2018/0121442 A1 | 5/2018 | Asadi et al. | |
| 2019/0114295 A1* | 4/2019 | Cao | G06F 16/24535 |
| 2019/0286635 A1* | 9/2019 | Yu | G06F 16/904 |

OTHER PUBLICATIONS

"U.S. Appl. No. 16/920,143, Non Final Office Action dated Oct. 2, 2020", 29 pgs.
"U.S. Appl. No. 16/941,236, Non Final Office Action dated Oct. 5, 2020", 32 pgs.
"U.S. Appl. No. 16/920,143, Final Office Action dated Jan. 22, 2021", 36 pgs.

(Continued)

*Primary Examiner* — Raquel Perez-Arroyo
(74) *Attorney, Agent, or Firm* — Schwegman Lundberg & Woessner, P.A.

(57) ABSTRACT

A database platform receives query instructions for a query on a database, where the query instructions include a geospatial-function join that includes a geospatial-function predicate. The database platform generates a query-execution plan by replacing the geospatial-function join with a single interval join that has an interval-join predicate that is implied by the geospatial-function predicate, and by also inserting a filter above the single interval join to apply the geospatial-function predicate. The database platform executes the query-execution plan, and returns query results in response to the query.

30 Claims, 11 Drawing Sheets

(56) References Cited

OTHER PUBLICATIONS

"U.S. Appl. No. 16/920,143, Response filed Jan. 4, 2021 to Non Final Office Action dated Oct. 2, 2020", 15 pgs.
"U.S. Appl. No. 16/941,236, Notice of Allowance dated Jan. 21, 2021", 9 pgs.
"U.S. Appl. No. 16/941,236, Response filed Jan. 4, 2021 to Non Final Office Action dated Oct. 5, 2020", 15 pgs.

* cited by examiner

US 11,036,739 B1

PERFORMING GEOSPATIAL-FUNCTION JOIN USING SINGLE INTERVAL JOIN

CROSS-REFERENCE TO RELATED APPLICATIONS

This application is a continuation of U.S. patent application Ser. No. 16/941,236, filed Jul. 28, 2020 and entitled "Performing Geospatial-Function Joins Using Point-Based Relation Splitting," which is a continuation of U.S. patent application Ser. No. 16/920,143, filed Jul. 2, 2020 and entitled "Performing Geospatial-Function Joins Using Interval Joins," which claims the benefit of U.S. Provisional Patent Application No. 63/030,872, filed May 27, 2020 and entitled "Systems and Methods for Performing Geospatial-Function Joins Using Interval Joins," all three of which are hereby incorporated herein in their respective entireties.

TECHNICAL FIELD

The present disclosure relates to database platforms, query processing, and geospatial data, and more particularly to systems and methods for performing geospatial-function joins using interval joins.

BACKGROUND

Database platforms are widely used for data storage and data access in computing and communication contexts. With respect to architecture, a database platform could be an on-premises database platform, a network-based database platform (e.g., a cloud-based database platform), a combination of the two, and/or include another type of architecture. With respect to type of data processing, a database platform could implement online transactional processing (OLTP), online analytical processing (OLAP), a combination of the two, and/or another type of data processing. Moreover, a database platform could be or include a relational database management system (RDBMS) and/or one or more other types of database management systems.

In a typical implementation, a database platform includes one or more databases that are maintained on behalf of a customer account. Indeed, the database platform may include one or more databases that are respectively maintained in association with any number of customer accounts, as well as one or more databases associated with a system account (e.g., an administrative account) of the database platform, one or more other databases used for administrative purposes, and/or one or more other databases that are maintained in association with one or more other organizations and/or for any other purposes. A database platform may also store metadata in association with the database platform in general and in association with particular databases and/or particular customer accounts as well. Users and/or executing processes associated with a given customer account may, via one or more types of clients, be able to cause data to be ingested into the database, and may also be able to manipulate the data, add additional data, remove data, run queries against the data, and so forth.

In an implementation of a database platform, a given database (e.g., a database maintained for a customer account) may reside as a database object within, e.g., a customer account, which may include other database objects (e.g., users, roles, and/or the like) as well. Furthermore, a given database object may itself contain one or more database objects such as schemas, tables, materialized views, and/or the like. A given table may be organized as a collection of records (e.g., rows) that each include a plurality of attributes (e.g., columns). In many implementations, database data is physically stored in multiple storage units, which may be referred to as files, blocks, micro-partitions, and/or by one or more other names. In many cases, a database on a database platform serves as a back end for one or more applications that are executing on one or more application servers.

BRIEF DESCRIPTION OF THE DRAWINGS

A more detailed understanding may be had from the following description, which is presented by way of example in conjunction with the following drawings, in which like reference numerals are used across the drawings in connection with like elements.

DETAILED DESCRIPTION

Figure 1:
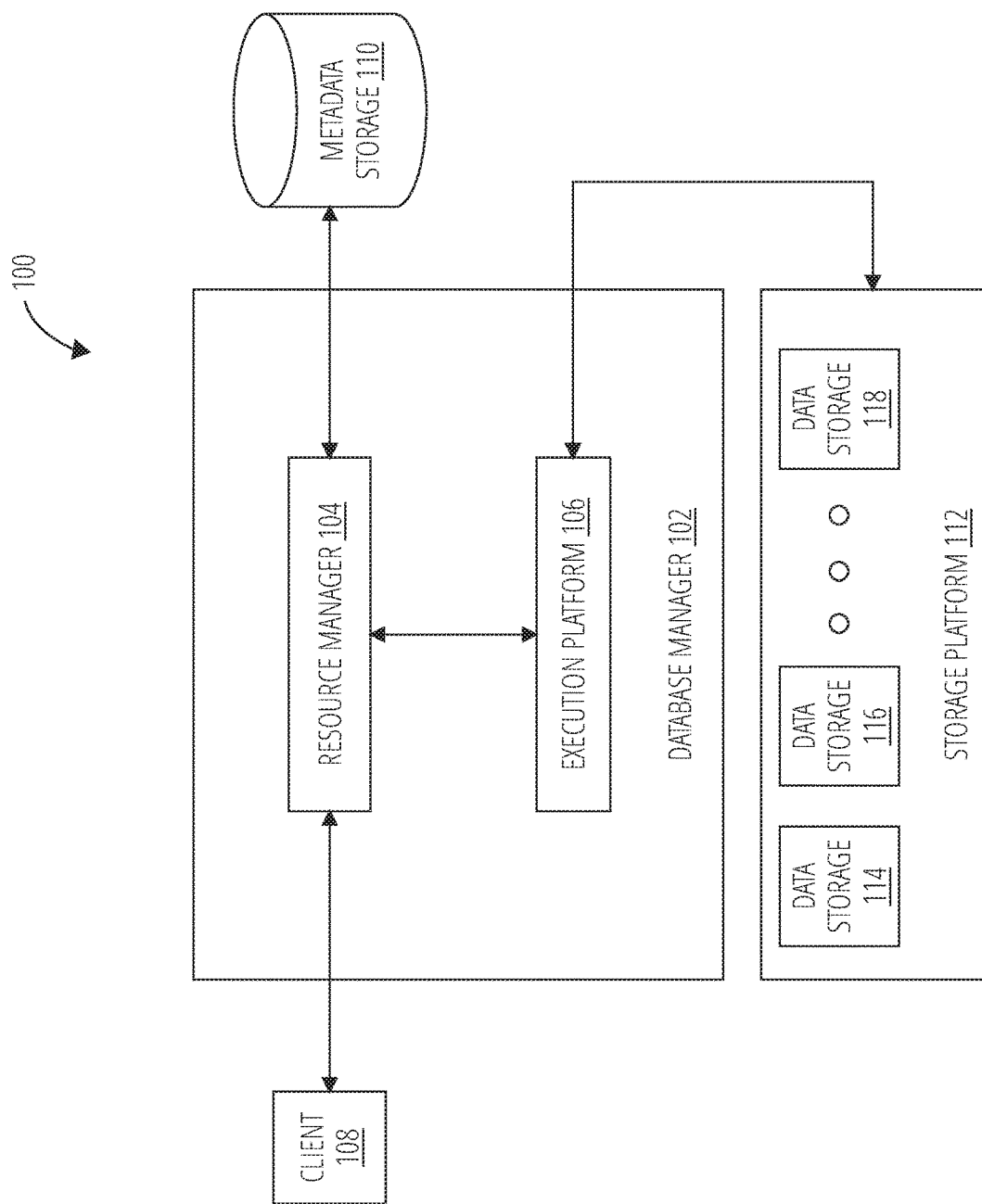
FIG. 1 illustrates an example database platform, in accordance with at least one embodiment.

Among the types of data that may be stored in a given database is geospatial data, which may be used to represent one or more geographical features. A geography data type may be defined to represent such geographical features, and a given instance of the geography data type may be referred to as a geography data object. Various examples of geography data objects include points, lines, polygons, and the like. A point may represent a particular geographic location having a particular longitude and latitude. A line, which is referred to in this disclosure as a linestring, may represent a street or a highway as examples, and may be composed of a contiguous set of one or more line segments, each of which may be defined as a shortest path in the relevant coordinate system between the two points that are at the respective ends of, and therefore define, the line segment. A polygon, which may be considered to be a special case of a linestring—i.e., a closed linestring, may include a set of points that collectively define a perimeter of a geographical area. In some cases, a polygon may include one or more of what are known as holes, each of which is a polygon within the bounds—and not considered part—of the larger polygon. In one example, a polygon may represent the landmass of a given county, and one or more holes within that polygon may each correspond to a lake situated within that county. Numerous other examples could be given as well. For example, a polygon could represent the city of Rome, and a hole within that polygon could correspond to Vatican City.

A given geography data object could, as discussed above, represent a single point or may instead include multiple points that form a linestring or a polygon. As used herein, unless otherwise qualified or specified, the term linestring refers to a non-closed linestring. A geography data object could include a collection of multiple geography data objects such as points, linestrings, polygons, and/or the like. An organization known as the Open Geospatial Consortium (OGC) publishes standards pertaining to the storage and processing of geospatial data in relational databases. Two such standards are (i) the OpenGIS® Implementation Standard No. OGC 06-103r4, Version 1.2.1, entitled "OpenGIS® Implementation Standard for Geographic information—Simple feature access—Part 1: Common architecture" (28 May 2011) and (ii) the OpenGIS® Implementation Standard No. OGC 06-104r4, Version 1.2.1, entitled "OpenGIS® Implementation Standard for Geographic information—Simple feature access—Part 2: SQL option" (4 Aug. 2010). The OGC also defines an eXtensible Markup Language (XML) format known as the Geography Markup Language (GML) for the expression of geographical features. Other formats for encoding geographical features include well-known text (WKT), well-known binary (WKB), and GeoJSON, which is an open standard format designed for representing simple geographical features. GeoJSON is based on JavaScript Object Notation (JSON).

In a given format used for representing geographical features, a point is typically represented as a set of coordinates in a coordinate system. In this disclosure, the examples are discussed and illustrated in the context of two-dimensional (2D) geometry and geography with the understanding that the principles discussed herein are extendable to three-dimensional (3D) (and higher-dimensional) geometries and geographies as well. In 2D, a point is represented as a pair of coordinates. In Cartesian domains, a point may be given by an $\{x, y\}$ pair, where x and y each represent a linear distance from their respective axis in a unit of measure such as meters, kilometers, feet, miles, and/or the like. In what are known as Earth domains, a point may be given by a $\{$longitude, latitude$\}$ pair. By convention, x and y in Cartesian domains correspond respectively with longitude and latitude in Earth domains, and that convention is followed in this disclosure. Longitude and latitude are typically expressed in degrees, with longitude ranging between −180 and 180 degrees and with latitude ranging between −90 and 90 degrees. Furthermore, the line of longitude at 0 degrees longitude is known as the Prime Meridian, and the line of longitude that is at both −180 and 180 degrees longitude is known as the Antimeridian. Positive longitude values are those east of the Prime Meridian up to the Antimeridian, and negative longitude values are those west of the Prime Meridian up to the Antimeridian. The Equator is at 0 degrees latitude, and the North and South Poles are at 90 and −90 degrees latitude, respectively.

In various different implementations, the surface of the Earth may be modeled as a plane, a sphere, or an ellipsoid, the latter of which is also known as a spheroid. The shape of line segments is different in these different Earth-domain models. As a general matter, among these three types of Earth-domain models, the actual shape of the Earth is generally most accurately represented by an ellipsoidal model in which (i) the Equator is longer than it is in a spherical model and (ii) the North Pole and South Pole are both closer to the center of the Earth than they are in a spherical model. Conversely, among these three types of Earth-domain models, the actual shape of the Earth is generally least accurately represented by planar models, with the lack of accuracy generally becoming more and more pronounced over greater and greater distances. In some of the examples that are discussed herein, a spherical model of Earth is used by way of illustration with the understanding that other models could be used. In Earth domains, coordinates are, as discussed above, typically expressed in terms of degrees whereas distances are typically expressed using units of measure such as meters, kilometers, feet, miles, and/or the like. In Cartesian domains, both distances and coordinates are typically expressed using such units of measure.

The OGC standards define various complex geospatial functions with agreed-upon semantics. Examples of these geospatial functions include ST_Covers, ST_CoveredBy, ST_Contains, ST_Within, ST_Distance, ST_DWithin, ST_Intersects, and ST_Buffer. The "ST" prefix on each geospatial-function name is an abbreviation for "spatial type." As used herein by way of example, the semantics of these various geospatial functions are as follows, where "g" represents a given geography data object, where "g1" and "g2" represent two different geography data objects, and where "d" represents a distance.

ST_Covers(g1, g2) returns TRUE if and only if every point in g2 is either within or touching the perimeter of g1, and otherwise returns FALSE;

ST_CoveredBy(g1, g2) is equivalent to ST_Covers(g2, g1);

ST_Contains(g1, g2) returns TRUE if and only if every point in g2 is within (but not touching) the perimeter of g1, and otherwise returns FALSE;

ST_Within(g1, g2) is equivalent to ST_Contains(g2, g1);

ST_Distance(g1, g2) returns the shortest distance between g1 and g2;

ST_Distance(g1, g2)<(or <=) d returns TRUE if and only if ST_Distance(g1, g2) is less than (or less than or equal to) d, and otherwise returns FALSE (as used herein, "<=" is equivalent to "<" and to the language "less than or equal to");

ST_DWithin(g1, g2, d) returns TRUE if and only if ST_Distance(g1, g2) is less than or equal to d, and otherwise returns FALSE;

ST_Intersects(g1, g2) returns TRUE if and only if g1 and g2 have at least one point in common, and otherwise returns FALSE; and ST_Buffer(g, d) returns a geography data object that contains all points that are less than or equal to (i.e., at most) d from g.

It is noted that later example uses of various ones of these functions replace "g," "g," and/or "g2" with one or more of "left.g" and "right.g," where "left" and "right" represent relations (also referred to as relational expressions) and where the "g" in this ".g" usage represents a geography data object that may be contained in a column of the associated relation, may be represented by a combination of multiple columns of the associated relation, or may be an output of a function performed on one or more columns of the associated relation, among other possibilities. Further explanation and examples in this regard are provided below. As used herein, a relation could be a table, an output of another operator in a query-execution plan, an inline view, a subquery, a materialized view, a stream of rows, another object having a plurality of rows, and/or the like.

With respect to query processing, it can occur that a join operator (also referred to as a join) in a query-execution plan includes a join predicate that itself contains a complex geospatial function such as ST_Contains. In the present disclosure, a join that includes such a join predicate is referred to as a geospatial-function join, and the corresponding join predicate is referred to as a geospatial-function predicate. In some current implementations of database platforms, in order to perform a geospatial-function join, an operation that is known as a cross join is performed, which involves generating what is referred to as the "Cartesian product" of the left-side relation and the right-side relation of the join. The Cartesian product of a given left-side relation and a given right-side relation includes rows that are every possible combination of one row from the given left-side relation and one row from the given right-side relation. The two relevant geography data objects—referred to herein as the geography-data-object join keys, one originally from the given left-side relation and the other originally from the given right-side relation—from each and every row of this Cartesian product are then input into a filter that implements the complex geospatial function, and those rows for which the geospatial function returns TRUE are included in the output of this filter whereas those rows for which the geospatial function returns FALSE are not included in the output of this filter. This approach is computationally expensive in terms of both processing resources and time, and accordingly is inefficient. In the design of query-processing logic for database platforms, the generation of Cartesian products (i.e., cross joins) of multiple relations is generally avoided where possible.

Some current database-platform implementations employ an approach for performing a geospatial-function join of two relations in a manner that avoids the use of a cross join by instead using specialized geographical indices such as nested rectangles or nested squares, as examples. Two approaches that utilize such indices are known as R-tree and Quadtree. It is noted that, if the two dimensions of geospatial points are combined using a linearization function (e.g., Z-order, Hilbert curve, and/or the like), an R-tree or a Quadtree can be reduced to a unidimensional hierarchy.

Returning to the 2D discussion, in R-tree, particular geography data objects are represented using what are known as bounding rectangles (i.e., bounding boxes). In some implementations, each such bounding rectangle is represented in stored data by two points (e.g., a southwest (or lower-left) corner and a northeast (or upper-right) corner). An R-tree of nested bounding rectangles of the geography data objects is constructed. Then, to determine (or at least initially approximately determine), for example, whether a first geography data object (e.g., a city) ST_Contains a second geography data object (e.g., a point), the point is used to "walk" the R-tree in order to identify the bounding rectangle of the city in either an intermediate or leaf-level node of the R-tree. If the bounding rectangle of the city includes the point (and, of course, if the one or more other (if any) join predicates are met as well), a join of the two relevant rows is included in a provisional join result, but if the bounding rectangle of the city does not include the point, a join of the two relevant rows is not included in the provisional join result. That provisional join result is then filtered through the actual ST_Contains function from a geographical or mathematical library in order to pare the provisional join result down to the actual join result.

A similar approach is used in Quadtree, in which a tree is constructed to represent nested squares that form a grid overlay of a geographical domain. In Quadtree, these squares are independent of any geographical features that may or may not overlay them. Geography data objects are thus defined by the set of the leaf-level squares that the respective geography data objects overlay. Then, to determine (or again, to at least initially approximately determine), for example, whether a first geography data object (e.g., a city) ST_Contains a second geography data object (e.g., a point), the Quadtree is walked using the point to identify the leaf-level square that includes that point. If the first geography data object includes that identified leaf-level square, a join of the two relevant rows is included in a provisional join result (again, if the one or more other (if any) join predicates are also met), otherwise a join of the two relevant rows is not included in the provisional join result. As above, that provisional join result may then be filtered through the actual ST_Contains function from a geographical or mathematical library in order to pare the provisional join result down to the actual join result. Though generally more efficient than the above-described cross-join approach, specialized-geographical-index approaches (e.g., R-tree and Quadtree) are, due to their architecture, difficult and/or impractical to implement in some types of database-platform implementations.

To address these and other shortcomings of prior implementations, disclosed herein are various embodiments of systems and methods for performing geospatial-function joins using what are known as interval joins. As mentioned above, as used herein, in some embodiments of the present disclosure, a geospatial-function join is a join that includes—among its one or more join predicates—a geospatial-function predicate that contains a geospatial function such as one of the above-listed complex geospatial functions. Moreover, in at least some embodiments of the present disclosure, an interval join is a join in which at least one join predicate involves either a comparison of a value to a range of values or involves a comparison of two ranges of values. As used herein, the term "one-sided interval join" refers to the former whereas the term "two-sided interval join" refers to the latter. Among other example contexts, interval joins are often deployed in connection with the processing of time-series data and in connection with the processing of genomic data. Interval joins are part of the functionality of many database-platform implementations, and can be implemented in a number of different ways, some examples of which are by using hash joins, B-tree index traversal, interval trees, modified equality joins (also referred to as equijoins), sort-merge joins, and/or the like.

In an example one-sided interval join of a left-side relation and a right-side relation, each row of the left-side relation includes a pair of values that are referred to herein as "L1_min" and "L-max" and that define an interval or range of an arbitrary variable "L1" This left-side relation also includes a pair of values that are referred to herein as "L2_min" and "L2_max" and that define an interval or range of an arbitrary variable "L2." These could be any types of values. As examples, L1_min and L1_max (or, equivalently, L2_min and L2_max) could respectively represent the starting and ending timestamps of an event, the minimum and maximum values of a given measurement (of, e.g., temperature, velocity, etc.), or any two other values that together define an interval or range. In some cases, one or more intermediate values of the corresponding interval or range are also present in the left-side relation; in other cases, no intermediate values of the corresponding interval or range are also present in the left-side relation. Also, in this example, each row of the right-side relation includes (i) one value of an arbitrary variable "R1" and (ii) one value of an arbitrary variable "R2." In this example, the one-sided interval join is conducted using a pair of interval-join predicates that together evaluate, for each possible pair of rows—one from the left-side relation and the other from the right-side relation, whether both of the following statements are true: (i) the interval defined by L1_min and L1_max in the current row of the left-side relation (respectively expressed below as "left.L1_min" and "left.L1_max") includes the R1 value from the current row of the right-side relation (expressed below as "right.R1") and (ii) the interval defined by L2_min and L2_max in the current row of the left-side relation ("left.L2_min" and "left.L2_max") includes the R2 value from the current row of the right-side-relation ("right.R2"). In this example, a given range is considered to include a given value if and only if (i) the minimum value of the given range is less than or equal to the given value and (ii) the given value is less than or equal to the maximum value of the given range. The two interval-join predicates, both of which would need to be true in order to include, in the join result, a joined row of the current left-side-relation row and the current right-side-relation row, may take the form shown just below. In this example and any other provided herein, multiple join predicates could be combined into a single join predicate using one or more logical "AND" operators.

left.$L1$_min<=right.$R1$<=left.$L1$_max left.$L2$_min<=right.$R2$<=left.$L2$_max In an example two-sided interval join of a left-side relation and a right-side relation, the left-side relation is as described above and the right-side relation, instead of including single values of R1 and R2, includes, like the left-side relation, (i) a pair of values "R1_min" and "R1_max" that define an interval or range of "R1" and (ii) a pair of values "R2_min" and "R2_max" that define an interval or range of "R2." As described above with respect to the left-side relation, the right-side relation could include or not include one or more intermediate values of the interval defined by R1_min and R1_max and/or one or more intermediate values of the interval defined by R2_min and R2_max. In this example, the two-sided interval join may be conducted using a set of interval-join predicates that together evaluate, for each possible pair of rows-one from the left-side relation and the other from the right-side relation, whether both of the following statements are true: (i) the interval defined by L1_min and L1_max in the current row of the left-side relation overlaps the interval defined by R1_min and R1_max in the current row of the right-side relation and (ii) the interval defined by L2_min and L2_max in the current row of the left-side relation overlaps the interval defined by R2_min and R2_max in the current row of the right-side relation. In this example, a first range is considered to overlap a second range if both of the following statements are true: (i) the minimum value of the first range is less than or equal to the maximum value of the second range and (ii) the minimum value of the second range is less than or equal to the maximum value of the first range. The set of (four) interval-join predicates, each of which would need to be true in order to include, in the join result, a joined row of the current left-side-relation row and the current right-side-relation row, may take the form of:

left.$L1$_min<=right.$R1$_max right.$R1$_min<=left.$L1$_max left.$L2$_min<=right.$R2$_max right.$R2$_min<=left.$L2$_max In another example of a two-sided interval join of the above-described left-side relation and right-side relation, a two-sided interval join may be conducted using a set of interval-join predicates that together evaluate, for each possible pair of rows—one from the left-side relation and the other from the right-side relation, whether both of the following statements are true: (i) the interval defined by L1_min and L1_max in the current row of the left-side relation contains the interval defined by R1_min and R1_max in the current row of the right-side relation and (ii) the interval defined by L2_min and L2_max in the current row of the left-side relation contains the interval defined by R2_min and R2_max in the current row of the right-side relation. In this example, a first range is considered to contain a second range if both of the following statements are true: (i) the minimum value of the first range is less than or equal to the minimum value of the second range and (ii) the maximum value of the second range is less than or equal to the maximum value of the first range. The set of (four) interval-join predicates, each of which would need to be true in order to include in the join result a joined row of the current left-side-relation row and the current right-side-relation row, may take the form of;

left.$L1$_min<=right.$R1$_min right.$R1$_max<=left.$L1$_max left.$L2$_min<=right.$R2$_min right.$R2$_max<=left.$L2$_max The example one-sided interval join and both example two-sided interval joins that are described above are examples of what are referred to herein as multidimensional interval joins in that each such interval join makes evaluations in two or more dimensions, in these examples the L1/R1 and L2/R2 dimensions. An interval join that makes evaluations in only a single dimension (e.g., only the L1/R1 dimension or only temperature values, etc.) is referred to herein as a one-dimensional interval join. In some cases, one-dimensional interval joins may be easier to implement than multidimensional interval joins—for that reason, some database platforms support one-dimensional interval joins but not multidimensional interval joins. As those of skill in the art will appreciate, then, some example variations of interval joins include one-sided one-dimensional interval joins, one-sided multidimensional interval joins, two-sided one-dimensional interval joins, and two-sided multidimensional interval joins.

As mentioned above, according to embodiments of the present disclosure, geospatial-function joins are conducted in a manner that includes using interval joins. In some embodiments, a database platform obtains (e.g., generates) a query-execution plan that includes a geospatial-function join, and then modifies that query-execution plan so as to conduct that geospatial-function join using one or more interval joins. In other embodiments, a database platform receives a query that includes a geospatial-function join, and then generates a query-execution plan in which that geospatial join is conducted using one or more interval joins. Furthermore, there may be more than one geospatial-function join that is conducted using one or more interval joins in accordance with embodiments of the present disclosure: for clarity and not by way of limitation, examples in which one geospatial-function join is conducted using one or more interval joins are primarily described herein.

In an example instance, a geospatial-function join includes a geospatial-function join predicate, which, as described above, is a term that is used herein to refer to a join predicate that includes a complex geospatial function such as ST_Contains, one of the other complex geospatial functions listed above, or another complex geospatial function. In this example, for simplicity, the geospatial-function predicate is the only join predicate in the example geospatial-function join, but there could be one or more additional join predicates as well. In an example use case, the geospatial function ST_Contains is used to identify which cities among a group of cites contain an office of a particular business. In this example, the left-side relation includes rows for respective cities, and one of the columns in the left-side relation is a geography data object that is a polygon representative of the perimeter of the city that is represented by that row. That column is the geography-data-object join key of the left-side relation in this example. Furthermore, in this example, the right-side relation includes rows for respective offices of the particular business, and one of the columns in the right-side relation is a geography data object that represents, as a point, the geographical location of the office that is represented by that row. That column is the geography-data-object join key of the right-side relation in this example. In other embodiments, instead of a single column containing the aforementioned polygon geography data object, the left-side relation contains columns for the x coordinate and the y coordinate of each point of that polygon. Similarly, instead of a single column containing the aforementioned point geography data object, the right-side relation may contain respective columns for the x coordinate and the y coordinate of that point. Such are design choices within the skill of those in the relevant art.

In at least one embodiment, in order to process this example geospatial-function join, the database platform conducts the geospatial-function join using one or more interval joins, each of which are configured to implement a set of one or more simple predicates (e.g., equalities, inequalities, interval predicates, and/or the like) that are implied by the particular geospatial-function join, which in this example includes a geospatial-function predicate that itself includes the complex geospatial function ST_Contains. The database platform may conduct this conversion of the geospatial-function join into one or more interval joins (and optionally one or more other query-execution-plan operators) at least in part by calling one or more functions that may be implemented in, e.g., Java code. In other embodiments, the database platform may conduct this conversion by executing a table lookup based on the particular complex geospatial function to retrieve a set of instructions to execute in order to carry out the conversion of the geospatial-function join into one or more interval joins. Other implementations are possible as well.

In at least some embodiments, as further described herein, in cases in which the database platform conducts a geospatial-function join using multiple interval joins, the database platform may use a union operator to generate a set union of the outputs of those multiple interval joins and, in at least some instances, the respective outputs of one or more other operators (e.g., a cross join) as well. The output of that set-union operator may then be fed into a filter that implements the actual complex geospatial-function predicate. In at least some embodiments in which the database platform conducts a geospatial-function join using a single interval join, the database platform may feed the output of that single interval join (directly) into such a filter.

In the present example, the database platform implements the ST_Contains geospatial-function join using a single two-sided, multidimensional interval join that has a set of interval-join predicates that are implied by the ST_Contains function. The database platform then executes that interval join using the set of implied interval-join predicates instead of the geospatial-function predicate. The city may have a perimeter that is not shaped like a regular polygon. The implied predicates in this example are essentially used to determine, for a given city and a given point, whether a bounding rectangle (e.g., a minimum bounding rectangle) for the city perimeter includes the given point. These predicates are implied in that, if a given point is contained within the perimeter of a given city, it is implied that the given point is also contained within the more-inclusive bounding rectangle of the perimeter of the given city. In embodiments of the present disclosure, geospatial-function predicates imply simpler interval-join predicates that are used in one or more interval joins.

This interval join generates a provisional join result that is at least potentially overinclusive in that the provisional join result includes all of the combinations in which an office of the business actually is located in a given city, and may also include one or more combinations in which an office of the business is located in the bounding rectangle for the given city but is not actually located in the city. The database platform may then process this provisional result using the actual ST_Contains predicate from a geographical or mathematical library in order to pare the provisional result down to the actual result of the modified join. That actual result will be the combinations in which an office of the particular business is actually contained within the perimeter of a given city. Other examples are described herein in connection with other complex geospatial functions, as well as in connection with interval joins that are one-sided, interval joins that are two-sided, interval joins that are one-dimensional, interval joins that are multidimensional, and query-execution plans in which one or more interval joins and a given geospatial-function filter are used in connection with one or more other operators such as a union operator, a relation-replication operator, a cross-join operator, and/or the like.

Thus, embodiments of the present disclosure involve a database platform efficiently joining relations on geospatial-function predicates by utilizing interval joins. The techniques described herein may be utilized by, for example, database platforms in which interval joins have been natively implemented irrespective of whether complex geospatial-function joins have or have not also been natively implemented in a given one of those database platforms. In embodiments of the present disclosure, a feature is said to be natively implemented by a database platform when that feature is implemented by the source code of the database platform without having to link in a library—e.g., a mathematical or geospatial library—that is external to the database platform (e.g., developed by an organization other than the organization that developed the database platform), where that external library contains one or more functions that are called by the source code of the database platform in order to use the feature. Conversely, in embodiments of the present disclosure, a feature is said to not be natively implemented by a database platform when that feature is provided by linking in an external library containing one or more functions that are called by the source code of the database platform in order to use the feature.

Some database platforms may have natively implemented interval joins for use in processing, e.g., time-series and/or genomic data. Regardless of the reason, such database platforms can use their native implementation of interval joins and then implement complex geospatial functions in the post-join-filter manner described above by either (i) using their native implementation of complex geospatial functions if they have one or (ii) linking in a geographical or mathematical library to make use of complex geospatial functions provided by that library. Embodiments of the present disclosure are expected to prove helpful in many different types of database platforms, including those that use an indexless data-processing architecture.

One example embodiment takes the form of a method that includes receiving, by a database platform that includes at least one hardware processor, query instructions for a query on a database. The query instructions include instructions for a geospatial-function join, which includes a geospatial-function predicate. The method also includes generating a query-execution plan based on the query instructions. The generating of the query-execution plan includes replacing the geospatial-function join with one or more interval joins, each of which includes one or more predicates that are implied by the geospatial-function predicate. The generating of the query-execution plan also includes inserting, into the query-execution plan-above the one or more interval joins, a filter operator that applies the geospatial-function predicate. The method also includes obtaining query results of the query at least in part by executing the query-execution plan. The method also includes returning the query results in response to the query.

Another embodiment takes the form of a system (e.g., a database platform) that includes at least one processor, and that also includes one or more computer-storage media containing instructions executable by the at least one processor for causing the at least one processor to perform at least the operations that are listed in the preceding paragraph. Still another embodiment takes the form of one or more computer-storage media containing instructions executable by at least one processor (of, e.g., a database platform) for causing the at least one processor to perform at least those operations.

Furthermore, a number of variations and permutations of the above-listed embodiments are described herein, and it is expressly noted that any variation or permutation that is described in this disclosure can be implemented with respect to any type of embodiment. For example, a variation or permutation that is primarily described in this disclosure in connection with a method embodiment could just as well be implemented in connection with a system embodiment (e.g., a database-platform embodiment), a computer-storage-medium embodiment, and/or one or more other types of embodiments. Furthermore, this flexibility and cross-applicability of embodiments is present in spite of the use herein of any slightly different language (e.g., processes, methods, methodologies, steps, operations, functions, and/or the like) to describe and/or characterize such embodiments and/or any element or elements thereof.

FIG. 1 illustrates an example database platform 100, in accordance with at least one embodiment. In various embodiments, the database platform 100 may be used for performing one or more of the operations of one or more of the methods (including processes and the like) disclosed herein. As shown in FIG. 1, the database platform 100 includes a database manager 102, which includes a resource manager 104 and an execution platform 106. The database manager 102 need not be a defined physical device, though it could be, but in general is used herein as shorthand to refer to the combination of the resource manager 104 and the execution platform 106. The execution platform 106 may include one or more execution nodes (e.g., servers, workers, threads, and/or the like). A grouping of execution nodes in the execution platform 106 may be referred to as a virtual warehouse, and such virtual warehouses are, in some embodiments, dynamically resizable to meet changing demands. Also depicted in FIG. 1 are a client 108, a metadata storage 110, and a storage platform 112.

In some embodiments, all of the entities that are depicted in FIG. 1 are part of what is referred to herein as the database platform 100, though this is not the case for all embodiments. For example, in at least one embodiment, the database platform 100 does not include the client 108. As another example, in some embodiments, the database platform 100 does not include the storage platform 112. In the embodiments that are primarily described herein, the database platform 100 includes the database manager 102 (including the resource manager 104 and the execution platform 106), the metadata storage 110, and the storage platform 112, and does not include the client 108. Other permutations are possible as well.

The resource manager 104 may be configured to manage a number of different types of tasks including external database tasks (e.g., query requests) that are received from, e.g., one or more clients such as the client 108. The resource manager 104 may be coupled to any number of clients, although only one is depicted by way of example in FIG. 1. The client 108 may facilitate end users making data-storage and/or data-retrieval requests, system administrators managing the database platform 100, and/or the like. In various different embodiments, the client 108 could be a web-interface client, a desktop application, a mobile app, a Java Database Connectivity (JDBC) client, an Open Database Connectivity (ODBC) client, and/or another type of client. As shown in FIG. 1, the client 108 may communicate with the database manager 102 (e.g., the resource manager 104).

As depicted in FIG. 1, the resource manager 104 is coupled to the metadata storage 110, which in an embodiment is associated with data stored throughout the database platform 100. In some embodiments, the metadata storage 110 includes a summary of data stored in remote data-storage systems (such as the storage platform 112) as well as data available in a local cache (of, e.g., the resource manager 104 and/or the execution platform 106). Additionally, the metadata storage 110 may include information regarding how data is organized in remote data-storage systems and in local caches. Among other uses, the metadata storage 110 may allow systems and services to determine whether a given quantum of data needs to be processed (in connection with, e.g., a given query) without loading or accessing the actual data from a storage device. In various embodiments, metadata that reflects the contents of a database, a table, a column, a materialized view, and/or one or more other collections of records or parts of records may be referred to herein as expression properties.

The resource manager 104 is further coupled to the execution platform 106, which may provide multiple computing resources that execute various data-storage and/or data-retrieval tasks. In at least one embodiment, the resource manager 104 includes a layer of code (e.g., Java code) that is global with respect to the database platform 100, where that code layer includes instructions for performing functions such as compiling queries and brokering requests to one or more execution nodes in the execution platform 106. In some embodiments, there exists one or more instances of the execution platform 106 used for executing client tasks, such as database queries and/or internal database tasks such as updating metadata, clustering tables, generating materialized views, and the like. In some such embodiments, there also exists one or more instances of the execution platform 106 used for feature development and/or testing, and each such instance of the execution platform 106 may be separate from each client instance of the execution platform 106, such that, for example, client-job processing is not impacted by feature-development tasks. Other arrangements are possible as well.

The execution platform 106 may be coupled to multiple data-storage devices such as one or more of a data-storage device 114, a data-storage device 116, and a data-storage device 118 that are part of the example storage platform 112. Although three data-storage devices are shown in FIG. 1, the storage platform 112 may include—and the execution platform 106 may be capable of communicating with—any number of data-storage devices. In some embodiments, one or more of the data-storage device 114, the data-storage device 116, and the data-storage device 118 are cloud-based storage devices located in one or more geographic locations. For example, one or more of the data-storage device 114, the data-storage device 116, and the data-storage device 118 may be part of a public cloud infrastructure or a private cloud infrastructure. One or more of the data-storage device 114, the data-storage device 116, and the data-storage device 118 may be or include hard disk drives (HDDs), solid state drives (SSDs), storage clusters and/or any other data-storage technology. In some examples, the storage platform 112 includes distributed file systems (such as Hadoop Distributed File Systems (HDFSs)), object storage systems, and/or the like.

As shown in FIG. 1, the storage platform 112—including the data-storage device 114, the data-storage device 116, and the data-storage device 118—is decoupled from the computing resources associated with the execution platform 106, the resource manager 104, and the database manager 102 generally. In an embodiment, each of a plurality of database-platform deployments includes a respective storage platform 112 having its own respective multiple data-storage devices. This architecture supports dynamic changes to the database platform 100 based on changing data-storage and/or data-retrieval needs, as well as changing needs of users and systems accessing the database platform 100. The support of dynamic changes allows the database platform 100 to scale quickly in response to changing demands on the systems and components within the database platform 100. The decoupling of the computing resources from the data-storage devices supports the storage of large amounts of data without requiring a corresponding large amount of computing resources. Similarly, this decoupling supports a significant increase in the computing resources utilized at a particular time without requiring a corresponding increase in data-storage resources.

As a general matter, in at least some embodiments, the database platform 100 can be referred to using terms such as a cloud-based data warehouse, a network-based data warehouse, or simply a data warehouse. A cloud-based data warehouse is one type of network-based data system that can be used for data analysis and reporting and that includes a central repository of integrated data from one or more disparate sources. A cloud-based data warehouse is commonly an OLAP database that can store current and historical data that can be used for creating analytical reports for an enterprise based on data stored within databases of the enterprise. To this end, data warehouses often provide business-intelligence tools, tools to extract, transform, and load data into the repository, and tools to manage and retrieve metadata, among other examples. There are other types of cloud-based data warehouses, such as OLTP databases, as well as data systems that operate with characteristics of multiple types of database systems.

Any one or more of the components, devices, systems, and/or the like that are depicted in FIG. 1 and in any of the other figures could be implemented as one or more computing devices having an architecture that is similar to the example computing device 1100 that is described below in connection with FIG. 11. Moreover, two or more of the entities that are depicted in any of the figures could be combined into a single component, and any entity that is depicted as a single component in any of the figures could instead be distributed across multiple components (e.g., distributed across multiple systems, platforms, and/or the like at multiple geographic locations). Moreover, in particular embodiments, any one or more of the communication links depicted in FIG. 1 and in any of the other figures could be implemented via one or more data-communication networks, which may utilize any communication protocol and any type of communication medium. In some embodiments, the data-communication networks are a combination of two or more data-communication networks (or sub-networks) coupled to one another. In various different embodiments, these communication links are implemented using any type of communication medium and any communication protocol.

Figure 2:
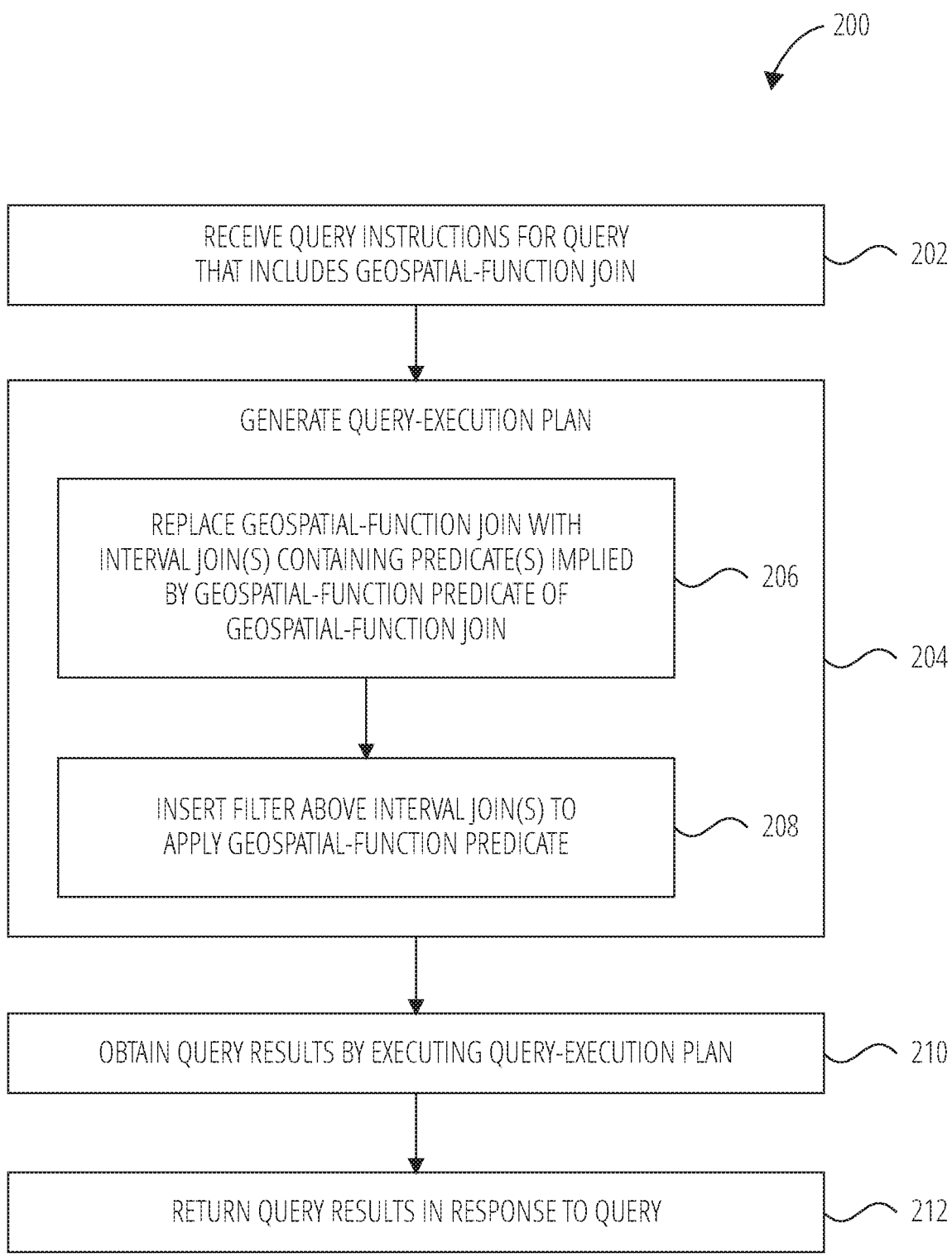
FIG. 2 illustrates an example method, in accordance with at least one embodiment.

FIG. 2 illustrates an example method 200, in accordance with at least one embodiment. In various different embodiments, the method 200 could be performed by any computing and communication device or system of such devices that is suitably equipped, programmed, and configured to perform the operations described herein. In some embodiments, all or part of the method 200 is performed by the database manager 102, which may involve one or more aspects of the method 200 being performed by the resource manager 104, one or more aspects of the method 200 being performed by the execution platform 106, and/or one or more aspects of the method 200 being performed by one or more other functional components of the database manager 102. By way of example and not limitation, the method 200 is described below as being performed by the database manager 102.

At operation 202, the database manager 102 receives query instructions for a query on a database, where that database may be maintained for a customer account associated with the client 108. The received query instructions include instructions for a geospatial-function join that includes a geospatial-function predicate. That geospatial-function predicate may include one or more geospatial functions such as those described herein and/or one or more other geospatial functions. Indeed, in some embodiments, the geospatial-function predicate is a geospatial-function predicate from a set of one or more geospatial-function predicates. In at least one such embodiment, that set of one or more geospatial-function predicates includes one or more of a covers predicate (including, e.g., the geospatial function ST_Covers), a covered-by predicate (including, e.g., the geospatial function ST_CoveredBy), a contains predicate (including, e.g., the geospatial function ST_Contains), a within predicate (including, e.g., the geospatial function ST_Within), a within-distance predicate (including, e.g., the geospatial function ST_DWithin or a geospatial expression of the form ST_Distance< (or <=) a specified distance), and an intersects predicate (including, e.g., the geospatial function ST_Intersects). In at least one embodiment, the set of one or more geospatial-function predicates includes a covers predicate, a covered-by predicate, a contains predicate, a within predicate, a within-distance predicate, and an intersects predicate. Groups of these predicates can be defined as well. As one example, ST_Covers, ST_CoveredBy, ST_Contains, and ST_Within are referred to herein at times as containment geospatial-function predicates.

At operation 204, the database manager 102 generates a query-execution plan based on the query instructions received at operation 202. The database manager 102 may receive the query instructions from the client 108 or from another source. In some cases, that other source may be within the database platform 100. In some embodiments, the query instructions are or at least include the query itself, and operation 204 involves generating the query-execution plan based on the query. In other embodiments, the query instructions are or at least include a preliminary query-execution plan: after receiving the preliminary query-execution plan, the database manager 102 performs operation 204 at least in part by modifying the preliminary query-execution plan. In still other embodiments in which the received query instructions are or at least include the query itself, and the database manager 102 generates a preliminary query-execution plan based on the received query. In such examples, the preliminary query-execution plan may include the geospatial-function predicate, and generating the query-execution plan based on the query instructions may include modifying the preliminary query-execution plan. As is shown in FIG. 2, in some embodiments, the operation 204 includes an operation 206 and an operation 208, both of which are described below.

At operation 206, the database manager 102 replaces the geospatial-function join with one or more interval joins, each of which includes one or more implied predicates, where each such implied predicate is implied by the geospatial-function predicate that is being replaced by the one or more interval joins. One example of simpler predicates that are implied by a complex geospatial function is described above, and further such examples are described below. In general, the one or more interval joins with which the database manager 102 replaces the geospatial-function join (e.g., the geospatial-function predicate of the geospatial-function join) could be exactly one interval join, exactly two interval joins, a higher number of interval joins, one or more one-sided interval joins, one or more two-sided interval joins, one or more one-dimensional interval joins, and/or one or more multidimensional interval joins.

As was mentioned above and as is discussed more fully below, in embodiments of the present disclosure, none of the one or more implied predicates is itself a complex geospatial function. Rather, the one or more implied predicates are, in some embodiments, much simpler predicates such as equalities, inequalities, interval predicates, and/or the like. These implied predicates are significantly cheaper to execute as join predicates in terms of processing resources and time in comparison with executing complex geospatial functions as join predicates. Moreover, joins on such simpler predicates are significantly cheaper to execute in terms of processing resources and time as compared with cross joins, and in particular as compared with a cross join followed by application of a complex geospatial-function predicate to a result of the cross join. As used herein, an "interval predicate" may be a simple predicate such as low<=x<=high, whereas an "interval-join predicate" is a term used herein to refer to any predicate used in an interval join. Thus, interval-join predicates can include equality predicates (e.g., x1=x2), inequality predicates (e.g., x1<=x2), interval predicates (left.x_min<=right.x<=left.x_max), and/or the like.

At operation 208, the database manager 102 inserts, into the query-execution plan, a filter operator above the one or more interval joins from operation 206. The filter operator applies the geospatial-function predicate that is replaced by the one or more interval joins at operation 206. For example, if the geospatial-function predicate included the function ST_Contains, the filter operator applies ST_Contains to its input, examples of which are described below. In some cases, the input of the filter operator is the output of an interval join (e.g., a multidimensional two-sided interval join). In other cases, the input of the filter operator is the output of a union operator-some such examples are described below. The filter operator could have other inputs as well. In at least one embodiment, the output of the filter operator is the results (i.e., the final results) of the query for which the query instructions were received at operation 202. In other cases, the output of the filter operator is the input to one or more other portions of a query-execution plan.

At operation 210, the database manager 102 obtains query results by executing the query-execution plan that is generated at operation 204 (using at least operation 206 and operation 208). Furthermore, as described more fully below, in one or more embodiments, the execution of the query-execution plan at operation 210 includes the database manager 102 preprocessing one or both of the left-side relation and the right-side relation of the one or more interval joins that were inserted into the query-execution plan in operation 206. As one example, in some embodiments, the preprocessing of a given relation includes processing (i) the geography-data-object join key "g" of each row of that relation and (ii) a distance "d" through a geospatial function such as ST_Buffer (from, e.g., a mathematical or geospatial library) to generate, for each row, a modified geography data object "g'" that contains all points of "g" as well as all points that are no more than the distance "d" away from "g," where g' may then be used in one or more interval-join predicates of one or more interval joins. Further examples of preprocessing one or more relations prior to executing one or more interval joins are described below.

At operation 212, the database manager 102 returns the obtained query results in response to the query. The performing of the operation 212 by the database manager 102 may include or take the form of sending the query results to a requesting entity (e.g., the client 108), storing the query results in one or more data-storage locations, transmitting the query results to one or more other entities, and/or outputting the query results to one or more user interfaces, as examples.

Definition of Some Auxiliary Functions

Prior to discussing some query-execution plans (or portions thereof) that are generated in accordance with some example embodiments of the present disclosure, it is useful to define certain functions that are referred to herein as auxiliary functions, and on which later derivations are based. The following auxiliary functions take one or more geospatial data objects (represented by g, g1, g2, and the like) (and in some cases a distance that is represented as d) as input and return a number, a Boolean value, a geography data object, or another type of returned value, per their definitions below. It is noted that geography data objects are referred to interchangeably herein at times as geospatial objects and at times as geospatial data objects. The below-defined auxiliary functions are used below to rewrite geospatial-function predicates into interval-join predicates in following sections.

Similar to the above description, as used below, an auxiliary function XMIN(g) calculates and returns the minimum x coordinate among all of the one or more points in a geospatial object g. XMIN(g) may then round the result to a level of precision specified by the database platform 100. In one embodiment, that level of precision is given by a fixed number having up to three digits before the decimal point and up to seven digits after the decimal point. Numerous other levels of precision could be used instead, and different levels of precision may be used in different cases within a given embodiment. In a fashion similar to XMIN(g), the auxiliary function XMAX(g) returns the maximum x coordinate of g, YMIN(g) returns the minimum y coordinate of g, and YMAX(g) returns the maximum y coordinate of g. Here and elsewhere in this disclosure, "x" values could be longitude values and "y" values could be latitude values. Moreover, in at least one embodiment, these auxiliary functions are realized by the functions ST_XMIN, ST_XMAX, ST_YMIN, and ST_YMAX in the OGC standards.

An auxiliary function X(g) returns the x coordinate of a point object, if that is what g is—i.e., if, given the rounding conventions of a given embodiment, g can be represented by a single number in the x dimension. In particular, in an embodiment, X(g) returns XMIN(g) if XMIN(g) is equal to XMAX(g), and otherwise returns a null value (e.g., a SQL NULL). An auxiliary function Y(g) may be similarly implemented, mutatis mutandis. In various different embodiments, X(g) and Y(g) return non-null values for points, geospatial collections that contain at least one point, and/or any other geospatial objects (e.g., linestrings, polygons, and/or the like) that are reduced to a single point after rounding in accordance with the rounding convention of the implementation.

An auxiliary function ISPOINT(g) is defined such that it returns a Boolean TRUE if g maps to a single point after rounding (or without rounding being necessary). In particular, ISPOINT(g) is defined herein as follows:

ISPOINT($g$):=($X$MIN($g$)=$X$MAX($g$)) AND
($Y$MIN($g$)=$Y$MAX($g$))

Moreover, NOT ISPOINT(g) is used herein at times to logically invert the result of ISPOINT(g). Thus, if ISPOINT (g) returns TRUE, NOT ISPOINT(g) returns FALSE, and vice versa.

Adjustment for Earth Domains

This section describes adjustments, one or more of which are made in various different embodiments, for Earth domains—be they planar, spherical, ellipsoidal or otherwise—as compared with Cartesian domains. This section starts with the following premise: if a point p is contained in a geospatial object g, then the coordinates of p must be contained in the coordinate range of g—i.e., p is contained in g if and only if:

(($X$MIN($g$)<=$X$($p$)<=$X$MAX($g$)) AND ($Y$MIN($g$)<=
$Y$($p$)<=$Y$MAX($g$)))

(As mentioned above, in this disclosure, in Earth domains, x values are used as shorthand for longitude values and y values are used as shorthand for latitude values.) And while the description below is offered in the context of the above predicate, the below-described adjustments can be made in one or more other predicates that include one or more of auxiliary functions such as XMIN(g), XMAX(g), YMIN(g), YMAX(g), and/or the like.

The section below that is entitled "Implied Predicates—Multidimensional Interval Joins" makes use of the above predicate to derive implied predicates for some example geospatial functions. While the above predicate is true without adjustment in Cartesian domains, adjustments to the above predicate are made in some embodiments in Earth domains at least in the context of geospatial objects that cross the Antimeridian. As an example, a line segment that roughly goes from Fiji (located approximately at (176, −20) in (longitude, latitude)) to American Samoa (located approximately at (−172, −14)) contains the point (−178, −17), but the above predicate would be false using these numbers. That is, the above predicate would indicate that the example line segment does not include the example point when it actually does. In particular, the first half of this predicate would be false, causing the entire predicate to be false, because, leaving aside longitudes for a moment, the integer −178 is not between the integers −172 and 176, inclusive (although −178 degrees longitude is between −172 degrees longitude and 176 degrees longitude on the shortest earthly path between those two). To account for this, in at least some embodiments, the following adjustment is made: If a geospatial object g crosses the Antimeridian, then set:

$X$MIN($g$)=−180 degrees longitude $X$MAX($g$)=180 degrees longitude

This adjustment clearly results in the first half of the above predicate being true, since every possible longitude is between −180 degrees longitude and 180 degrees longitude, inclusive.

As for how to determine whether a given geospatial object g crosses the Antimeridian, in at least one embodiment, the Antimeridian is represented as a linestring, and a standard geospatial library function such as ST_Intersects is used to determine whether g ST_Intersects (i.e, crosses) the linestring that represents the Antimeridian. As a first example, the Antimeridian could be represented as two line segments: a first line segment extending from the point (180, 90) (i.e., the geographic North Pole) to the point (180, 0) (i.e., the intersection of the Antimeridian and the Equator) and a second line segment extending from the point (180, 0) to the point (180, −90) (i.e., the geographic South Pole). As a second example, the Antimeridian could be represented as three line segments: a first extending from the point (180, 90) to the point (180, 30), a second extending from the point (180, 30) to the point (180, −30), and a third extending from the point (180, —30) to the point (180, −90). Other sets of linestrings could be used as well. In any one or more of those points, −180 degrees longitude could be substituted for 180 degrees longitude, as those are equivalent.

In at least one embodiment, as a preprocessing step prior to executing a given interval join, the database manager 102 tests the geography-data-object join keys from the left-side relation and the geography-data-object join keys of the right-side relation using a function such as: ST_Intersects(g, Antimeridian_linestring)
where:

g is a given geography-data-object join key; and
Antimeridian_linestring may be defined in one of the example ways listed above or another equivalent way.

By convention, in at least some embodiments, no geospatial objects cross the poles. If a data set does not observe this convention, the database manager 102 may make an equivalent adjustment (and preprocessing operation) in the y dimension, i.e., for geography data objects that are determined to cross one or both of the poles, the following adjustment is made:

$Y$MIN($g$)=−90 degrees $Y$MAX($g$)=90 degrees

Implied Predicates—Multidimensional Interval Joins

As mentioned above, in at least one embodiment, instead of using one or more of the geospatial-function predicates described above (e.g., ST_Contains), the database manager 102 uses one or more simpler and typically broader interval-join predicates that are implied by the one or more geospatial-function predicates and that are derived using one or more of the auxiliary functions described above and, in some cases, some preprocessing of relations using the geospatial function ST_Buffer. In some embodiments, the one or more interval-join predicates are in a form that can be processed using a two-sided multidimensional interval join. Additionally, if the geospatial-data-object join keys of one or both sides of the join are points, some of these predicates can be further simplified so that they can be processed using one-sided multidimensional interval joins. Using one-sided interval joins as opposed to two-sided interval joins where possible can be beneficial for at least two reasons. First, some database systems support one-sided interval joins but do not support two-sided interval joins. Second, even when both are supported, one-sided interval joins can be more efficient.

Moreover, it is often the case that large collections of geospatial data are made up largely of points. As examples, smartphone and vehicle tracking can generate enormous amounts of point data. On the other hand, collections of linestrings, polygons, and/or the like (representing, e.g., roads, counties, states, and/or the like) are often fixed and much more limited in number. Therefore, deriving simpler predicates for object-to-point and/or point-to-point interval joins can result in significant benefits with respect to at least processing resources and processing time.

Containment Predicates

The geospatial-function predicates ST_Contains, ST_Covers, ST_Within, and ST_CoveredBy are referred to herein at times as containment predicates or geospatial-function containment predicates. According to at least one embodiment, if a geospatial object g1 contains a geospatial object g2, no point in g2 can have coordinates outside of the range of the coordinates of g1. Therefore, in at least one embodiment, ST_Contains(g1, g2) and ST_Covers(g1, g2) both imply:

$$(X\text{MIN}(g1) <= X\text{MIN}(g2)) \text{ AND}$$

$$(X\text{MAX}(g2) <= X\text{MAX}(g1)) \text{ AND}$$

$$(Y\text{MIN}(g1) <= Y\text{MIN}(g2)) \text{ AND}$$

$$(Y\text{MAX}(g2) <= Y\text{MAX}(g1))$$

This implied predicate can be processed using a two-sided multidimensional interval join. In this predicate and in others listed herein, unless otherwise specified, x and y can refer to Cartesian coordinates or respectively to longitude and latitude in Earth domains. If g2 is a point, the above predicate can be further simplified as:

$$(X\text{MIN}(g1) <= X(g2) <= X\text{MAX}(g1)) \text{ AND}$$

$$(Y\text{MIN}(g1) <= Y(g2) <= Y\text{MAX}(g1))$$

This implied predicate can be processed using a one-sided multidimensional interval join. ST_Within(g1, g2) and ST_CoveredBy(g1, g2) can be processed using the same predicate, but with g1 and g2 reversed.

Intersection Predicates

The geospatial-function predicate ST_Intersects is referred to herein at times as an intersection predicate or a geospatial-function intersection predicate. According to at least one embodiment, if a geospatial object g1 intersects a geospatial object g2, their coordinate intervals must overlap. Therefore, ST_Intersects(g1, g2) implies:

$$(X\text{MIN}(g1) <= X\text{MAX}(g2)) \text{ AND}$$

$$(X\text{MIN}(g2) <= X\text{MAX}(g1)) \text{ AND}$$

$$(Y\text{MIN}(g1) <= Y\text{MAX}(g2)) \text{ AND}$$

$$(Y\text{MIN}(g2) <= Y\text{MAX}(g1))$$

This predicate can be processed using a two-sided multidimensional interval join.

In embodiments in which ST_Intersects(g1, g2) is defined such that it returns TRUE if and only if g1 and g2 have at least one point in common, and otherwise returns FALSE, the above predicate could be used with the adaptation that, for example if g1 is a point (and g2 is a linestring or polygon), XMIN(g1) and XMAX(g1) would both be replaced by X(g1), and YMIN(g1) and YMAX(g1) would both be replaced by Y(g1). In that example, a one-sided multidimensional interval join having the following slightly rearranged and simplified predicate could be used:

$$(X\text{MIN}(g2) <= X(g1) <= X\text{MAX}(g2)) \text{ AND}$$

$$(Y\text{MIN}(g2) <= Y(g1) <= Y\text{MAX}(g2))$$

If, instead, g2 is a point and g1 is a linestring or polygon, XMIN(g2) and XMAX(g2) could be both replaced by X(g2), YMIN(g2) and YMAX(g2) could both be replaced by Y(g2), and a one-sided multidimensional interval join having the following predicate could be used:

$$(X\text{MIN}(g1) <= X(g2) <= X\text{MAX}(g1)) \text{ AND}$$

$$(Y\text{MIN}(g1) <= Y(g2) <= Y\text{MAX}(g1))$$

If both g1 and g2 are points, the predicate could be reduced to an equality join:

$$(X(g1) = X(g2)) \text{ AND}$$

$$(Y(g1) = Y(g2))$$

In some embodiments, ST_Intersects is not used when one or the other of g1 and g2 is a point. In some embodiments, ST_Intersects is not used when both g1 and g2 are points.

Within-Distance Predicates

In at least one embodiment, the geospatial-function predicates ST_DWithin, (ST_Distance<d), and (ST_Distance<=d) are referred to as within-distance predicates or as geospatial-function within-distance predicates. To derive a simplified predicate for ST_DWithin(g1, g2, d) or the equivalent (ST_Distance(g1, g2)<=d), a first step can be to identify an object g1' as the result of executing the function ST_Buffer(g1, d) (or an object g2' as the result of executing the function ST_Buffer(g2, d)). In the interval-join predicates listed below in connection with within-distance predicates, the object g1' (or g2' in the case of an object g2, etc.) is expressed within the relevant interval-join predicates as "ST_Buffer(g1, d)" (or "ST_Buffer(g2, d)," etc.).

Moreover, it is noted that the equivalent within-distance predicates ST_DWithin(g1, g2, d) and (ST_DISTANCE(g1, g2)<=d) both imply:

$$ST\_Intersects(ST\_Buffer(g1,d),g2)$$

As established above in the subsection entitled "Intersection Predicates," the predicate ST_Intersects(ST_Buffer(g1, d), g2) implies the following intersection predicate:

$$(X\text{MIN}(ST\_Buffer(g1,d))<=X\text{MAX}(g2))\text{ AND}$$

$$(X\text{MIN}(g2)<=X\text{MAX}(ST\_Buffer(g1,d)))\text{ AND}$$

$$(Y\text{MIN}(ST\_Buffer(g1,d))<=Y\text{MAX}(g2))\text{ AND}$$

$$(Y\text{MIN}(g2)<=Y\text{MAX}(ST\_Buffer(g1,d)))$$

This predicate can be processed using a two-sided multidimensional interval join. Additionally, if g2 is a point, this predicate can be simplified to:

$$(X\text{MIN}(ST\_Buffer(g1,d))<=X(g2)<=X\text{MAX}(ST\_Buffer(g1,d)))\text{ AND}$$

$$(Y\text{MIN}(ST\_Buffer(g1,d))<=Y(g2)<=Y\text{MAX}(ST\_Buffer(g1,d)))$$

That predicate can be processed using a one-sided multidimensional interval join.

Furthermore, it is also noted that the equivalent within-distance predicates ST_DWithin(g1, g2, d) and (ST_DISTANCE(g1, g2)<=d) also both imply:

$$ST\_Intersects(g1,ST\_Buffer(g2,d))$$

Similar to the derivation just above, this predicate implies the following intersection predicate:

$$(X\text{MIN}(g1)<=X\text{MAX}(ST\_Buffer(g2,d)))\text{ AND}$$

$$(X\text{MIN}(ST\_Buffer(g2,d))<=X\text{MAX}(g1))\text{ AND}$$

$$(Y\text{MIN}(g1)<=Y\text{MAX}(ST\_Buffer(g2,d)))\text{ AND}$$

$$(Y\text{MIN}(ST\_Buffer(g2,d))<=Y\text{MAX}(g1))$$

This predicate can be processed using a two-sided multidimensional interval join. Additionally, if g1 is a point, this predicate simplifies to:

$$(X\text{MIN}(ST\_Buffer(g2,d))<=X(g1)<=X\text{MAX}(ST\_Buffer(g2,d)))\text{ AND}$$

$$(Y\text{MIN}(ST\_Buffer(g2,d))<=Y(g1)<=Y\text{MAX}(ST\_Buffer(g2,d)))$$

That predicate can be processed using a one-sided multidimensional interval join.

Implied Predicates—One-Dimensional Interval Joins

The implied predicates that are derived above in the section entitled "Implied Predicates—Multidimensional Interval Joins" relate to intervals in two dimensions (e.g., x and y, longitude and latitude, etc.). Those implied predicates can be processed using one-sided or two-sided multidimensional interval joins. However, as mentioned above, some database-platform implementations support one-dimensional interval joins but do not support multidimensional interval joins. In such contexts, in some embodiments of the present disclosure, the implied predicates derived above in the multidimensional context can be "flattened" using what is known a linearization function such as Z-order, Hilbert curve, or any other linearization function that maps pairs of values (e.g., (x, y)) on to a one-dimensional space. Moreover, it is noted that, in some embodiments, linearization approaches such as are described herein can be used in database-platform implementations that support both one-dimensional interval joins and multidimensional interval joins.

In general, a linearization function L maps any two-dimensional point (x, y) to a single number L(x, y). At least some embodiments involve use of a linearization function L for which the minimum and maximum value of L(x, y) among all the points in a geospatial object g can be derived, i.e.:

$$L\text{MIN}(g)=\min(L(x,y))$$

$$L\text{MAX}(g)=\max(L(x,y))$$

where (x, y) is in g. If g is a point, the following can be defined:

$$L(g)=L(X(g),Y(g))$$

In at least some embodiments in which a Z-order linearization function is utilized, the following can be calculated:

$$L\text{MIN}(g)=L(X\text{MIN}(g),Y\text{MIN}(g))$$

$$L\text{MAX}(g)=L(X\text{MAX}(g),Y\text{MAX}(g))$$

Those of skill in the art are familiar with the calculation of LMIN(g) and LMAX(g) in the context of the utilization of other types of linearization functions such as the Hilbert curve. With respect to that function in particular, those of skill in the art will appreciate that the calculation of LMIN and LMAX may along the Hilbert curve can be computed by decomposing a geospatial object g into squares along the Hilbert curve and then computing the LMIN and LMAX of those squares. Such functions are available in well-known mathematical and geospatial libraries.

Containment Predicates

In the context of containment predicates, it is noted that, if a geospatial object g1 contains a geospatial object g2, then no point (x, y) in g2 can have an L(x, y) that is outside the range of L(x, y) for the points (x, y) in g1. Therefore:

$$ST\_Contains(g1,g2),$$

$$ST\_Covers(g1,g2),$$

$$ST\_Within(g2,g1),\text{ and}$$

$$ST\_CoveredBy(g2,g1)$$

each independently imply:

$$(L\text{MIN}(g1)<=L\text{MIN}(g2))\text{ AND}$$

$$(L\text{MAX}(g2)<=L\text{MAX}(g1))$$

This predicate can be processed using a two-sided one-dimensional interval join. Moreover, if the object g2 is a point, this predicate can be simplified to:

$$L\text{MIN}(g1)<=L(g2)<=L\text{MAX}(g1)$$

That predicate can be handled by a one-sided one-dimensional interval join.

Intersection Predicates

In the context of intersection predicates, it is noted that, if a geospatial object g1 intersects with a geospatial object g2, their linearized coordinate ranges must overlap. Therefore, ST_Intersects(g1, g2) implies:

$$(L\text{MIN}(g1)<=L\text{MAX}(g2))\text{ AND}$$

$$(L\text{MIN}(g2)<=L\text{MAX}(g1))$$

This predicate can be processed using a two-sided one-dimensional interval join. In embodiments in which ST_Intersects(g1, g2) is defined such that it returns TRUE if and only if g1 and g2 have at least one point in common, and otherwise returns FALSE, the above predicate could be used with the adaptation that, for example if g1 is a point (and g2 is a linestring or polygon), LMIN(g1) and LMAX(g1) would both be replaced by L(g1), resulting in the following slightly rearranged and simplified predicate:

$L\text{MIN}(g2) <= L(g1) <= L\text{MAX}(g2)$

That predicate can be handled by a one-sided one-dimensional interval join. If, instead, g2 is a point and g1 is a linestring or polygon, LMIN(g2) and LMAX(g2) could be both replaced by L(g2), resulting in the following predicate:

$L\text{MIN}(g1) <= L(g2) <= L\text{MAX}(g1)$

That predicate can also be handled by a one-sided one-dimensional interval join.

Within-Distance Predicates

In the context of within-distance predicates, the geospatial function ST_Buffers is used in some embodiments (in, e.g., a preprocessing operation prior to execution of one or more interval joins) to derive implied intersection predicates from within-distance predicates. As above, it is noted that the equivalent within-distance predicates ST_DWithin(g1, g2, d) and (ST_DISTANCE(g1, g2)<=d) both imply:

$ST\_\text{Intersects}(ST\_\text{Buffer}(g1,d),g2)$ which, per, the above subsection, implies:

$(L\text{MIN}(ST\_\text{BUFFER}(g1,d)) <= L\text{MAX}(g2))$ AND $(L\text{MIN}(g2) <= L\text{MAX}(ST\_\text{BUFFER}(g1,d)))$ This predicate can be processed using a two-sided one-dimensional interval join. Moreover, if g2 is a point, then this predicate can be simplified to:

$L\text{MIN}(ST\_\text{BUFFER}(g1,d)) <= L(g2) <= L\text{MAX}(ST\_\text{BUFFER}(g1,d))$ That predicate can be handled by a one-sided one-dimensional interval join.

Furthermore, it is also noted as above that the equivalent within-distance predicates ST_DWithin(g1, g2, d) and (ST_DISTANCE(g1, g2)<=d) also both imply:

$ST\_\text{Intersects}(g1, ST\_\text{Buffer}(g2,d))$ which, per, the above subsection, implies:

$(L\text{MIN}(g1) <= L\text{MAX}(ST\_\text{BUFFER}(g2,d)))$ AND $(L\text{MIN}(ST\_\text{BUFFER}(g2,d)) <= L\text{MAX}(g1))$ This predicate can be processed using a two-sided one-dimensional interval join. Moreover, if g1 is a point, then this predicate can be simplified to:

$L\text{MIN}(ST\_\text{BUFFER}(g2,d)) <= L(g1) <= L\text{MAX}(ST\_\text{BUFFER}(g2,d))$ That predicate can be handled by a one-sided one-dimensional interval join.

Query-Execution Plans

Building upon the simplified implied predicates that are derived above in the sections entitled "Implied Predicates—Multidimensional Interval Joins" and "Implied Predicates—One-Dimensional Interval Joins," this section of the present disclosure provides example query-execution plans (or portions thereof) for implementing complex geospatial-function joins using one or more interval joins, in accordance with some embodiments. It should be understood that each query-execution plan that is described below could be an entire query-execution plan or could instead represent a portion of a more extensive query-execution plan. The query-execution plans that are described below use the following example operators. Other operators could be used in various different implementations. As described below, "set of rows" or "sets of rows" are used as example relations.

Filter
  This operator applies a predicate to incoming rows and rejects those rows for which the predicate is false, outputting only those rows for which the predicate is true.
Replicate
  This operator replicates an incoming set of rows one or more times, so that the incoming set of rows can be used by two or more downstream operators.
CrossJoin:
  This operator generates a Cartesian product between two incoming sets of rows.
OneSidedIntervalJoin
  This operator implements a one-sided interval join.
TwoSidedIntervalJoin
  This operator implements a two-sided interval join.
Union
  This operator outputs a union of all of its two or more sets of incoming rows. In some embodiments, this operator also performs deduplication (i.e., eliminates duplicate rows from its output feed). In other embodiments, it does not.

For operators that involve predicates (i.e., Filter, OneSidedIntervalJoin, and TwoSidedIntervalJoin), those predicates are presented in the text of this disclosure. In some cases, where practicable, those predicates are also presented in the figures.

By way of comparison to embodiments of the present disclosure, as described above, if a database platform does not implement support for improving the efficiency of conducting geospatial joins, such a database platform may simply feed a left-side relation and a right-side relation into a cross join, and then filter the resulting Cartesian product of the left-side and right-side relations through a filter that applies the given complex geospatial function such as ST_Contains and/or the like. As shown in the example query-execution plans described below, because the simplified predicates are implied from—but not equivalent to—the complex geospatial-function predicates (other than in rare cases such as rectangular geographical features), the actual geospatial-function predicate is, in at least one embodiment, still evaluated in a Filter operator downstream from the one or more interval joins that are implemented. In embodiments of the present disclosure, however, that Filter operator will typically be processing far fewer rows than there would be in the Cartesian product of the incoming relations, thus saving processing resources and time.

In Database Platforms that Support Two-Sided Interval Joins

In embodiments in which the database platform 100 supports two-sided interval joins, the database manager 102 may implement geospatial-function joins using one or more two-sided interval joins. In some embodiments, the database manager 102 does so using one or more of the simplified implied predicates derived above. In embodiments in which the database platform 100 supports multidimensional two-sided interval joins, the database manager 102 may use one or more of the simplified implied predicates from the above section that is entitled "Implied Predicates—Multidimensional Interval Joins." In embodiments in which the database platform 100 supports one-dimensional two-sided interval joins, the database manager 102 may use one or more of the simplified implied predicates from the above section that is entitled "Implied Predicates—One-Dimensional Interval Joins."

Containment Predicates

Figure 3:
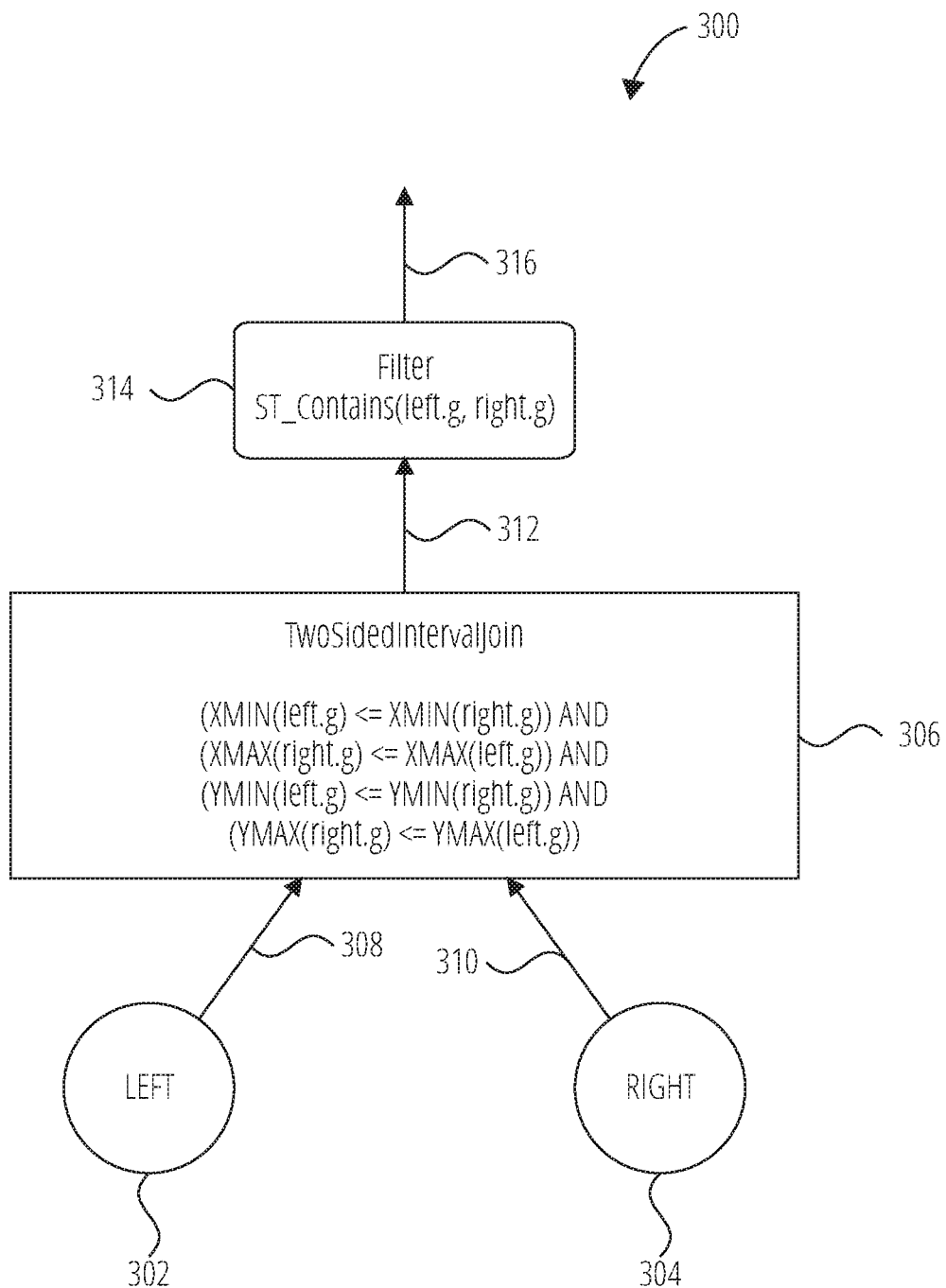
FIG. 3 illustrates a first example query-execution plan, in accordance with at least one embodiment.

FIG. 3 illustrates an example query-execution plan 300, in accordance with at least one embodiment. In an embodiment, the database manager 102 (at operation 202 of the method 200) receives query instructions that are or include the following:

SELECT expressions
FROM left
JOIN right
ON ST_Contains(left.g, right.g)

where, in this and the other examples described herein, "expressions," if present, could be any one or more columns or other suitable expressions. Additionally, in this and the other examples described below, "left" and "right" are relations that each have a column named "g" that contains geography data objects. (In other embodiments, "g" could be a representation of multiple (x, y) points stored in respective columns, or the output of a function that returns a geospatial object, and/or the like—but for simplicity and clarity of explanation, in this and in the below examples, both the left and right relations have a respective column named "g" that contains geospatial objects.) Furthermore, in this and the other examples discussed herein, one or more other geospatial-function predicates could be present, and/or one or more other join predicates could be present as well, though again for simplicity, the examples that are presented involve a single join predicate that is a geospatial-function predicate.

Responsive to receiving these query instructions, the database manager 102 generates (at operation 204) the example query-execution plan 300, including replacing (at operation 206) the geospatial-function predicate "ST_Contains(left.g, right.g)" with a two-sided interval join 306, and also including inserting (at operation 208) a geospatial-predicate filter 314 above the two-sided interval join 306. By convention, in query-execution plans as described herein, "below" and "upstream" generally mean "executed before" whereas "above" and "downstream" generally mean "executed after." Such is the convention in the relevant art, and that convention is followed here.

As can be seen in FIG. 3, a left-side relation 302 is input into the two-sided interval join 306 at interval-join input 308, and a right-side relation 304 is input into the two-sided interval join 306 at interval-join input 310. The two-sided interval join 306 implements the following implied predicate:

$(X\text{MIN}(\text{left}.g){<}{=}X\text{MIN}(\text{right}.g))$ AND $(X\text{MAX}(\text{right}.g){<}{=}X\text{MAX}(\text{left}.g))$ AND $(Y\text{MIN}(\text{left}.g){<}{=}Y\text{MIN}(\text{right}.g))$ AND $(Y\text{MAX}(\text{right}.g){<}{=}Y\text{MAX}(\text{left}.g))$ The two-sided interval join 306 outputs an interval-join output 312, which includes only those combinations of rows, one from the left-side relation 302 and the other from the right-side relation 304, for which that implied predicate is true. The interval-join output 312 is the input of the geospatial-predicate filter 314, which applies the actual ST_Contains(left.g, right.g) function to pare the interval-join output 312 down to those rows for which that actual geospatial-function predicate is true. Those rows make up the geospatial-predicate-filter output 316 of the geospatial-predicate filter 314. In this example and in one or more others, the database manager 102 may have linked in a geospatial and/or mathematical library in order to implement complex geospatial functions such as ST_Contains. In some examples, the database platform 100 has a native implementation of such geospatial functions. In at least one embodiment, the same query-execution plan 300 is used when, instead of ST_Contains(left.g, right.g), the geospatial-function predicate is instead ST_Covers(left.g, right.g), ST_Within(right.g, left.g), or ST_CoveredBy(right.g, left.g).

It is noted that FIG. 3 shows implied predicates for a multidimensional two-sided interval join. In embodiments in which a one-dimensional two-sided interval join is used, the predicate could be selected from the "Containment Predicates" subsection of the "Implied Predicates—One-Dimensional Interval Joins" section above. The architecture of the query-execution plan would be the same as that shown in connection with the query-execution plan 300 in FIG. 3.

Figure 4:
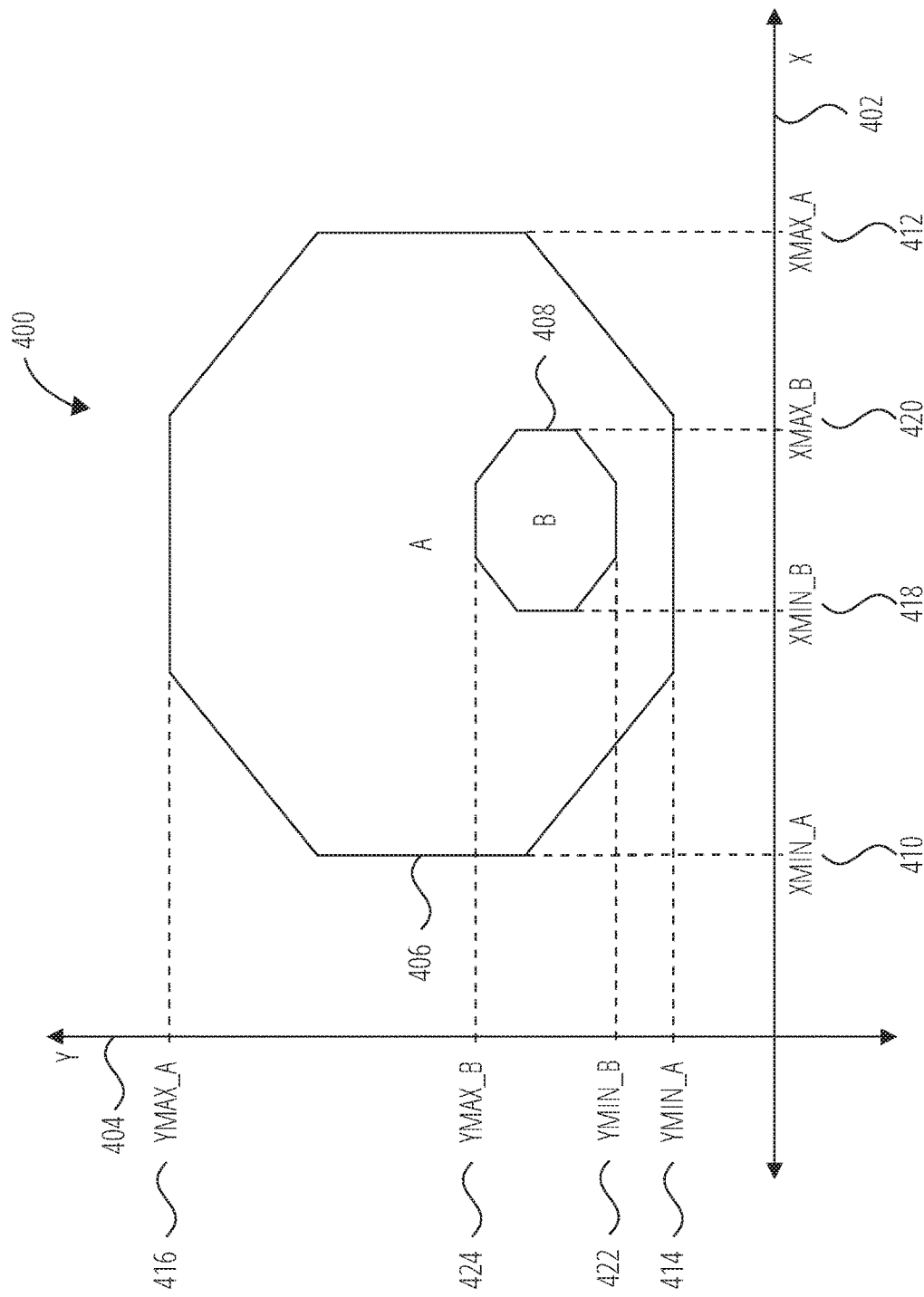
FIG. 4 illustrates a first example graph depicting one example geography data object containing another example geography data object, in accordance with at least one embodiment.
Figure 5:
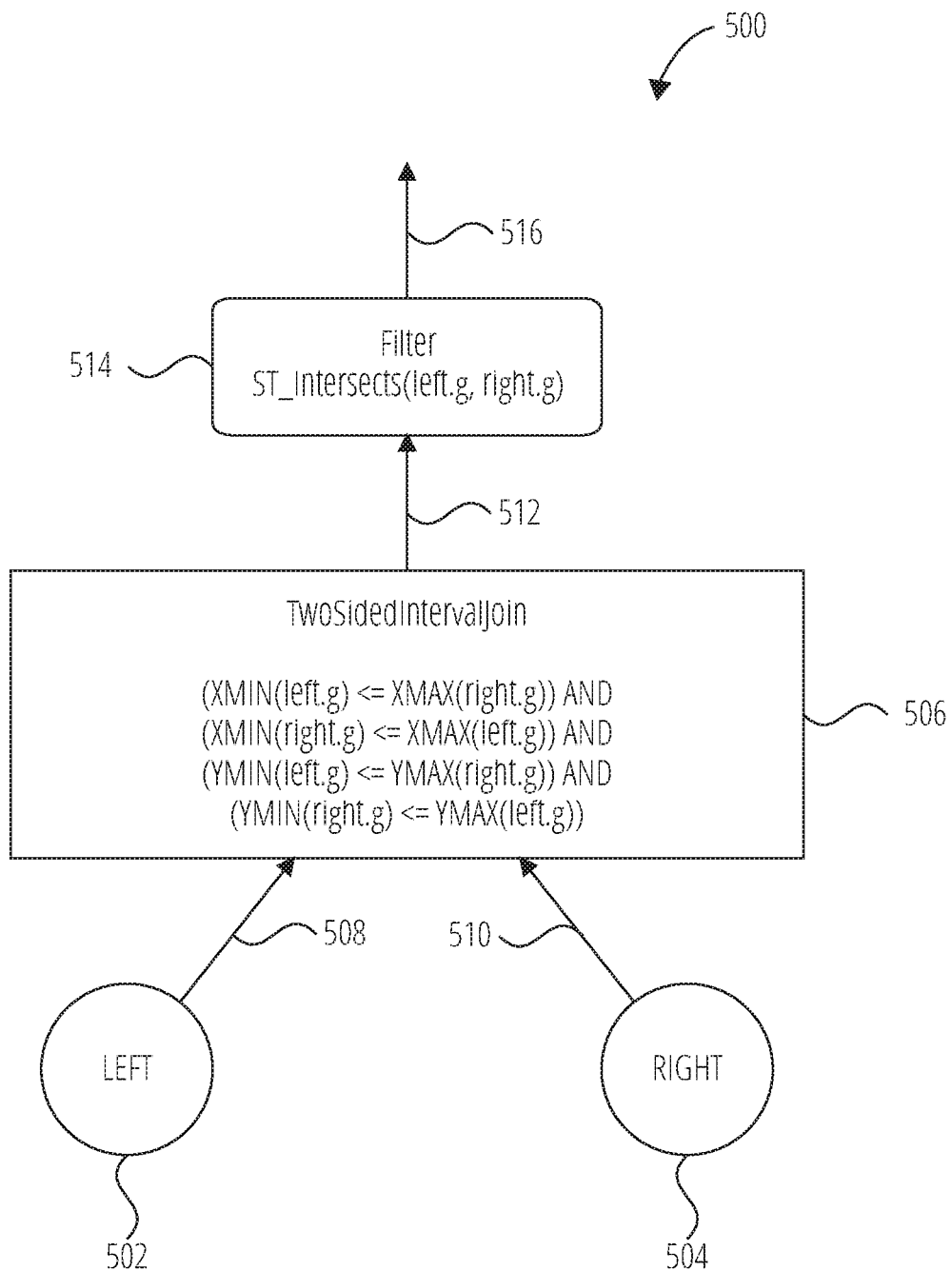
FIG. 5 illustrates a second example query-execution plan, in accordance with at least one embodiment.

FIG. 4 illustrates a graph 400 depicting an example of one example geography data object, a polygon A 406, containing another example geography data object, a polygon B 408, in accordance with at least one embodiment. Thus, the graph 400 illustrates, in a Cartesian domain having an x axis 402 and a y axis 404, two example geography data objects that would satisfy both the implied predicate and the geospatial-function predicate shown in—and discussed above in connection with—FIG. 3. For example, for a given combination of rows, one from the left-side relation 302 and the other from the right-side relation 304, the polygon A 406 could be an example of a left.g object that contains a right.g object, which could be represented by the polygon B 408. As can be visually appreciated in FIG. 4, the polygon A 406 and the polygon B 408 satisfy the following implied predicate:

$(X\text{MIN}(\text{left}.g){<}{=}X\text{MIN}(\text{right}.g))$ AND $(X\text{MAX}(\text{right}.g){<}{=}X\text{MAX}(\text{left}.g))$ AND $(Y\text{MIN}(\text{left}.g){<}{=}Y\text{MIN}(\text{right}.g))$ AND $(Y\text{MAX}(\text{right}.g){<}{=}Y\text{MAX}(\text{left}.g))$ in that all of the following are true:

$X\text{MIN}\_A\ 410{<}{=}X\text{MIN}\_B\ 418$ $X\text{MAX}\_B\ 420{<}{=}X\text{MAX}\_A\ 412$ $Y\text{MIN}\_A\ 414{<}{=}Y\text{MIN}B\ 422$ $Y\text{MAX}\_B\ 424{<}{=}Y\text{MAX}\_A\ 416$ Intersection Predicates FIG. 5 illustrates an example query-execution plan 500, in accordance with at least one embodiment. In an embodiment, the database manager 102 receives (at operation 202) query instructions that are or include the following:

SELECT expressions
FROM left
JOIN right
ON ST_Intersects(left.g, right.g)

Responsive to receiving these query instructions, the database manager 102 generates (at operation 204) the example query-execution plan 500, including replacing (at operation 206) the geospatial-function predicate "ST_Intersects(left.g, right.g)" with a two-sided interval join 506, and also including inserting (at operation 208) a geospatial-predicate filter 514 above the two-sided interval join 506. As can be seen in FIG. 5, a left-side relation 502 is input into the two-sided interval join 506 at interval-join input 508, and a right-side relation 504 is input into the two-sided interval join 506 at interval-join input 510. The two-sided interval join 506 implements the following implied predicate:

($X$MIN(left.g)<=$X$MAX(right.g)) AND ($X$MIN(right.g)<=$X$MAX(left.g)) AND ($Y$MIN(left.g)<=$Y$MAX(right.g)) AND ($Y$MIN(right.g)<=$Y$MAX(left.g))

The two-sided interval join 506 outputs an interval-join output 512, which includes only those combinations of rows, one from the left-side relation 502 and the other from the right-side relation 504, for which that implied predicate is true. The interval-join output 512 is the input of the geospatial-predicate filter 514, which applies the actual ST_Intersects(left.g, right.g) function to pare the interval-join output 512 down to those rows for which that actual geospatial-function predicate is true. Those rows make up the geospatial-predicate-filter output 516 of the geospatial-predicate filter 514.

It is noted that FIG. 5 shows implied predicates for a multidimensional two-sided interval join. In embodiments in which a one-dimensional two-sided interval join is used, the predicate could be selected from the "Intersection Predicates" subsection of the "Implied Predicates—One-Dimensional Interval Joins" section above. The architecture of the query-execution plan would be the same as that shown in connection with the query-execution plan 500 in FIG. 5.

Figure 6:
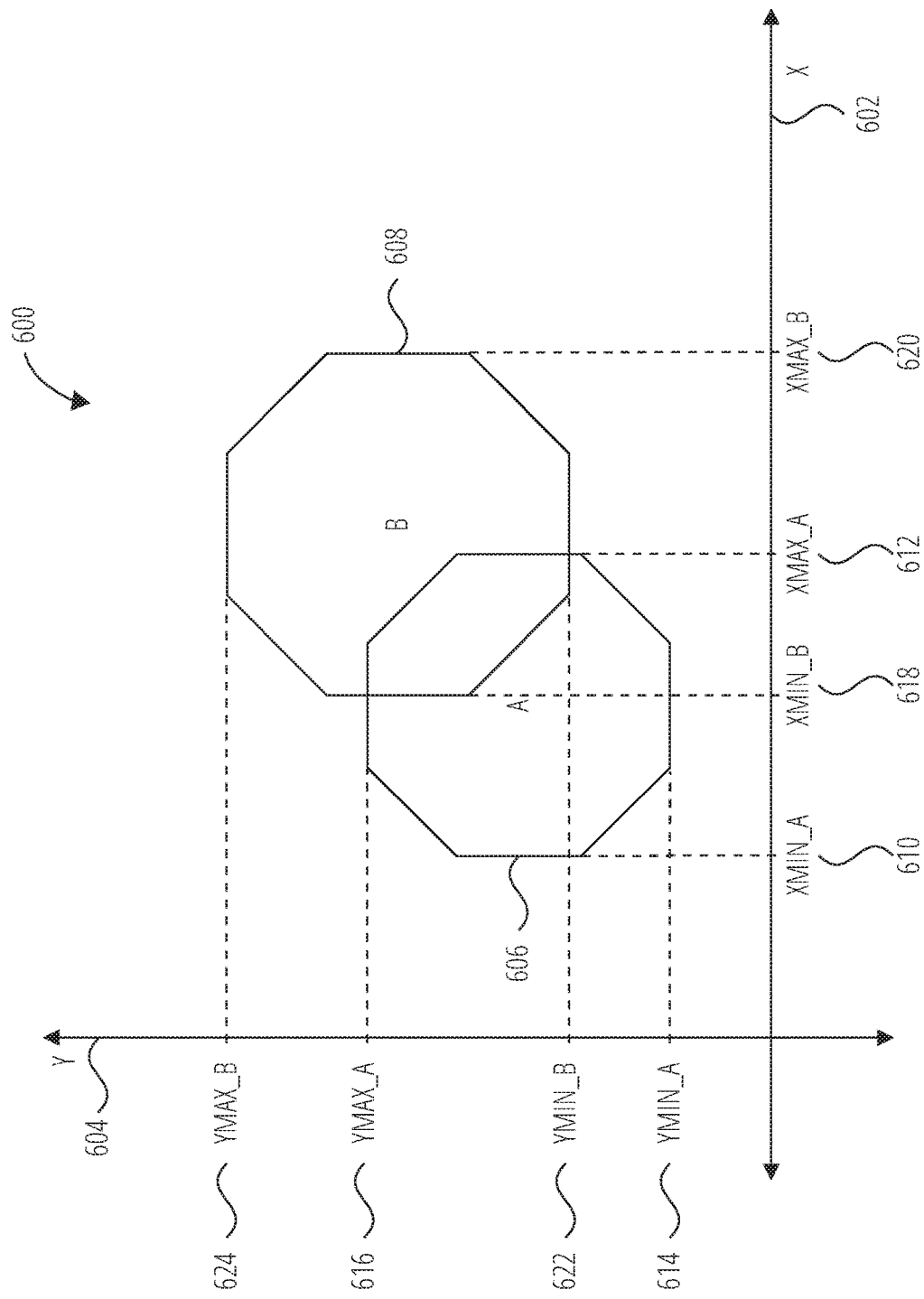
FIG. 6 illustrates a second example graph depicting overlap of two example geography data objects, in accordance with at least one embodiment.

FIG. 6 illustrates a graph 600 depicting overlap of two example geography data objects, a polygon A 606 and a polygon B 608, in accordance with at least one embodiment. Thus, the graph 600 illustrates, in a Cartesian domain having an x axis 602 and a y axis 604, two example geography data objects that would satisfy both the implied predicate and the geospatial-function predicate shown in—and discussed above in connection with—FIG. 5. For example, for a given combination of rows, one from the left-side relation 502 and the other from the right-side relation 504, the polygon A 606 could be an example of a left.g object that intersects a right.g object, which could be represented by the polygon B 608. As can be visually appreciated in FIG. 6, the polygon A 606 and the polygon B 608 satisfy the following implied predicate:

($X$MIN(left.g)<=$X$MAX(right.g)) AND ($X$MIN(right.g)<=$X$MAX(left.g)) AND ($Y$MIN(left.g)<=$Y$MAX(right.g)) AND ($Y$MIN(right.g)<=$Y$MAX(left.g))

in that all of the following *are* true:

$X$MIN_$A$ 610<=$X$MAX_$B$ 620

$X$MIN_$B$ 618<=$X$MAX_$A$ 612

$Y$MIN_$A$ 614<=$Y$MAX_$B$ 624

$Y$MIN_$B$ 622<=$Y$MAX_$A$ 616

Within-Distance Predicates

Figure 7:
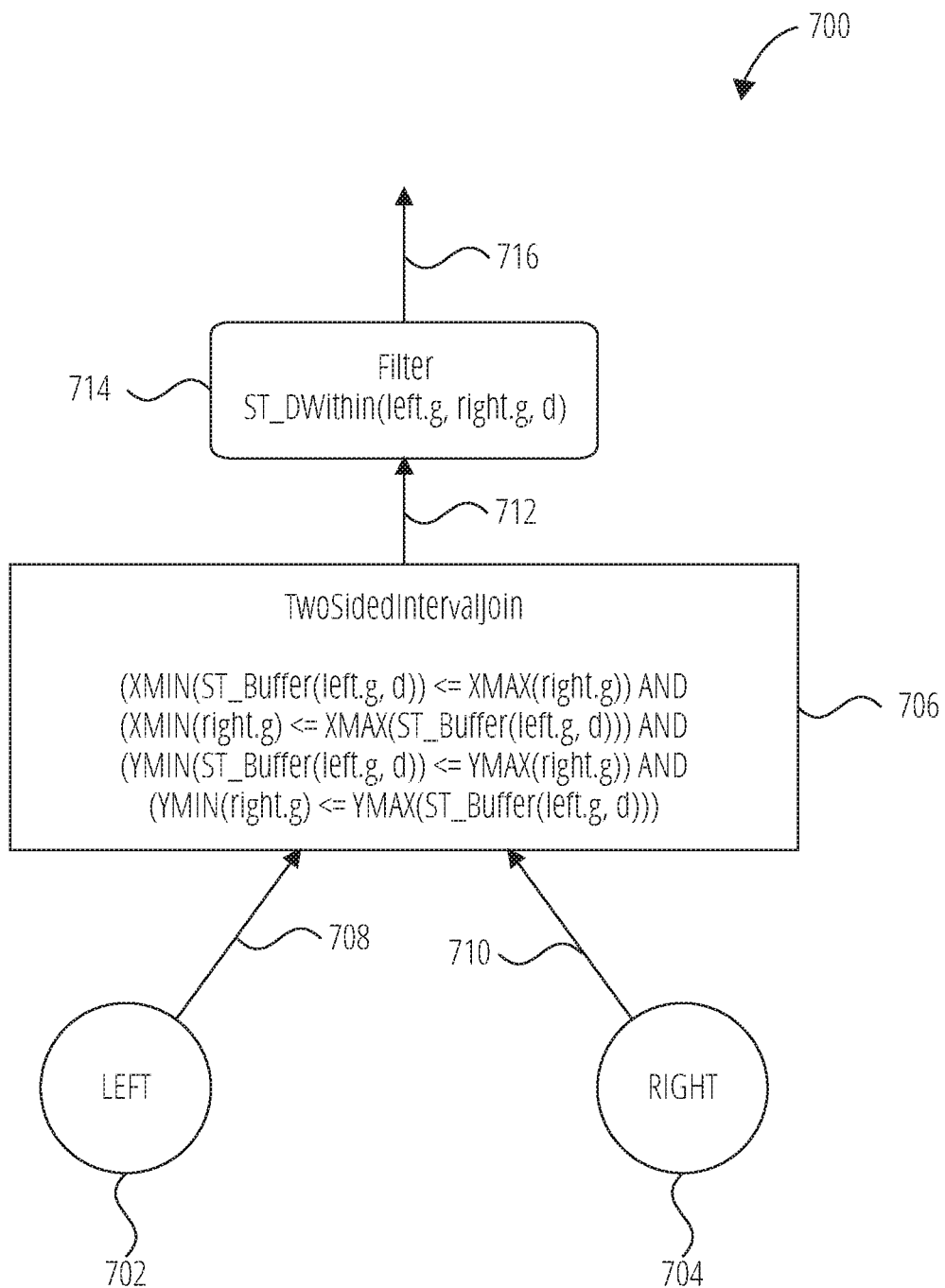
FIG. 7 illustrates a third example query-execution plan, in accordance with at least one embodiment.

FIG. 7 illustrates an example query-execution plan 700, in accordance with at least one embodiment. In an embodiment, the database manager 102 receives (at operation 202) query instructions that are or include the following:
SELECT expressions
FROM left
JOIN right
ON ST_DWithin(left.g, right.g, d)
[or, equivalently, ON (ST_Distance(left.g, right.g)<=d)]

Responsive to receiving these query instructions, the database manager 102 generates (at operation 204) the example query-execution plan 700, including replacing (at operation 206) the geospatial-function predicate "ST_DWithin(left.g, right.g, d)" with a two-sided interval join 706, and also including inserting (at operation 208) a geospatial-predicate filter 714 above the two-sided interval join 706. As can be seen in FIG. 7, a left-side relation 702 is input into the two-sided interval join 706 at interval-join input 708, and a right-side relation 704 is input into the two-sided interval join 706 at interval-join input 710. The two-sided interval join 706 implements the following implied predicate:

($X$MIN($ST$_Buffer(left.g, $d$))<=$X$MAX(right.g)) AND ($X$MIN(right.g)<=$X$MAX($ST$_Buffer(left.g, $d$))) AND ($Y$MIN($ST$_Buffer(left.g, $d$))<=$Y$MAX(right.g)) AND ($Y$MIN(right.g)<=$Y$MAX($ST$_Buffer(left.g, $d$)))

As discussed above, the appearance in the above predicate of "ST_Buffer(left.g, d)" does not imply that the ST_Buffer function is carried out at the time that the two-sided interval join 706 is executed; rather, in at least one embodiment, the ST_Buffer function is carried out as a preprocessing step before the two-sided interval join 706 is executed. In other expressions of the same predicate, "ST_Buffer(left.g, d)" could be replaced by a reference to a geospatial object such as "left.g'" that could be returned by that function. The two-sided interval join 706 outputs an interval-join output 712, which includes only those combinations of rows, one from the left-side relation 702 and the other from the right-side relation 704, for which that implied predicate is true. The interval-join output 712 is the input of the geospatial-predicate filter 714, which applies the actual ST_DWithin(left.g, right.g, d) function to pare the interval-join output 712 down to those rows for which that actual geospatial-function predicate is true. Those rows make up the geospatial-predicate-filter output 716 of the geospatial-predicate filter 714.

It is noted that FIG. 7 shows implied predicates for a multidimensional two-sided interval join. In embodiments in which a one-dimensional two-sided interval join is used, the predicate could be selected from the "Within-Distance Predicates" subsection of the "Implied Predicates—One-Dimensional Interval Joins" section above. The architecture of the query-execution plan would be the same as that shown in connection with the query-execution plan 700 in FIG. 7.

Figure 8:
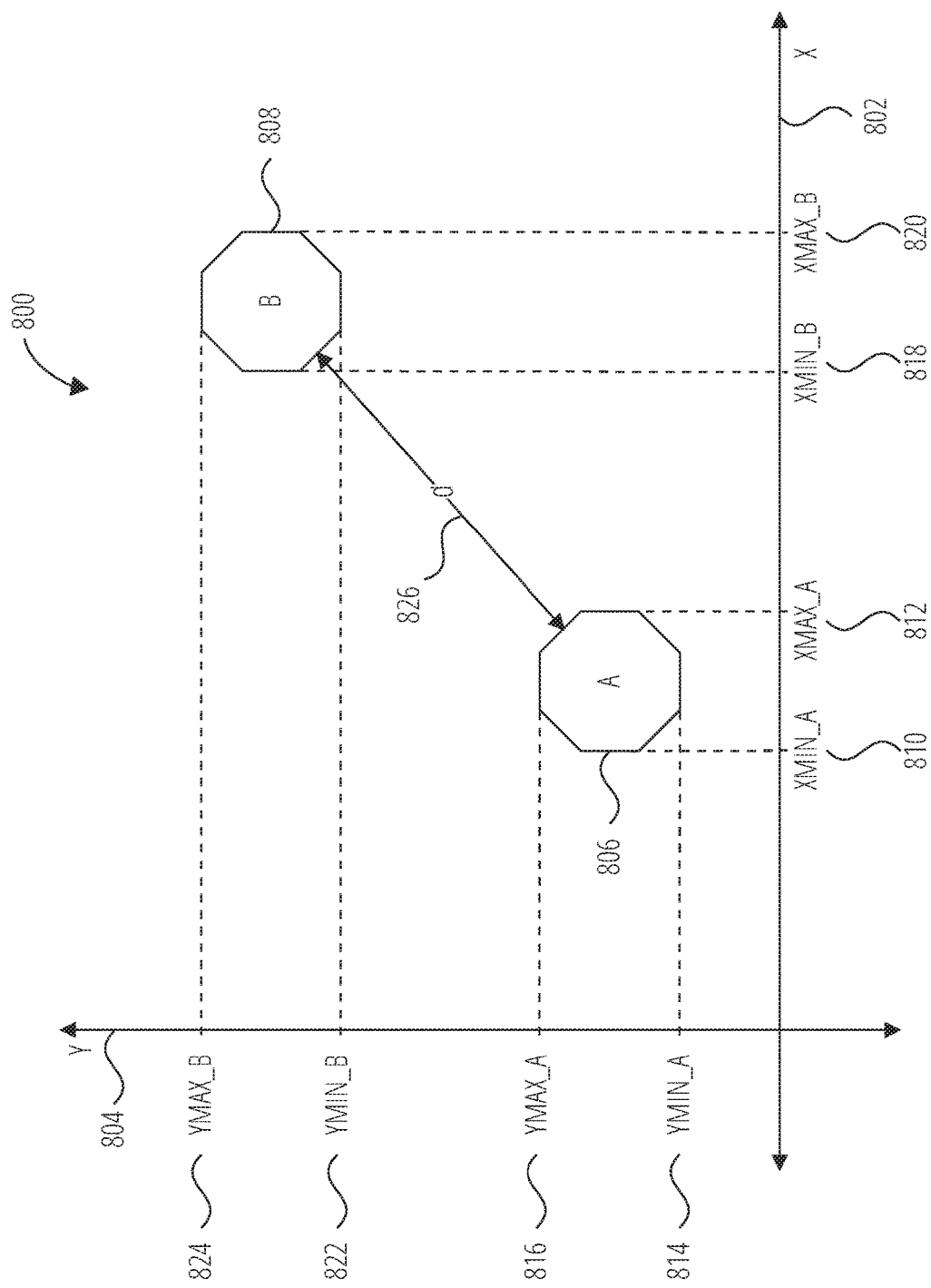
FIG. 8 illustrates a third example graph depicting two example geography data objects separated by a distance, in accordance with at least one embodiment.

FIG. 8 illustrates a graph 800 depicting two example geography data objects, a polygon A 806 and a polygon B 808 separated by a distance d 826, in accordance with at least one embodiment. Thus, the graph 800 illustrates, in a Cartesian domain having an x axis 802 and a y axis 804, two example geography data objects that would satisfy both the implied predicate and the geospatial-function predicate shown in—and discussed above in connection with—FIG. 7. For example, for a given combination of rows, one from the left-side relation 702 and the other from the right-side relation 704, the polygon A 806 could be an example of a left.g object that is separated from a right.g object, which could be represented by the polygon B 808, by the distance d 826. Although not explicitly visually depicted in FIG. 8, it can be appreciated that the polygon A 806 and the polygon B 808 satisfy the following implied predicate:

$(X\text{MIN}(ST\_\text{Buffer}(left.g, d)) <= X\text{MAX}(right.g))$ AND $(X\text{MIN}(right.g) <= X\text{MAX}(ST\_\text{Buffer}(left.g, d)))$ AND $(Y\text{MIN}(ST\_\text{Buffer}(left.g, d)) <= Y\text{MAX}(right.g))$ AND $(Y\text{MIN}(right.g) <= Y\text{MAX}(ST\_\text{Buffer}(left.g, d)))$ which means that all of the following are true:

$X\text{MIN}(ST\_\text{Buffer}(\text{polygon } A\ 806, \text{distanced } 826)) <= X\text{MAX}\_B\ 820$ $X\text{MIN}\_B\ 818 <= X\text{MAX}(ST\_\text{Buffer}(\text{polygon } A\ 806, \text{distanced } 826))$ $Y\text{MIN}(ST\_\text{Buffer}(\text{polygon } A\ 806, \text{distanced } 826)) <= Y\text{MAX}\_B\ 824$ $Y\text{MIN}\_B\ 822 <= Y\text{MAX}(ST\_\text{Buffer}(\text{polygon } A\ 806, \text{distanced } 826))$ Also depicted in FIG. 8 but not explicitly mentioned in the above predicates are XMIN_A 810, XMAX_A 812, YMIN_A 814, and YMAX_A 816.

In Database Platforms that Support One-Sided Interval Joins

In embodiments in which the database platform 100 supports one-sided interval joins (and may or may not support two-sided interval joins), a number of query-execution plans that include one or more one-sided interval joins can be generated to conduct geospatial-function joins. Some such example embodiments are described below.

Containment Predicates

Figure 9:
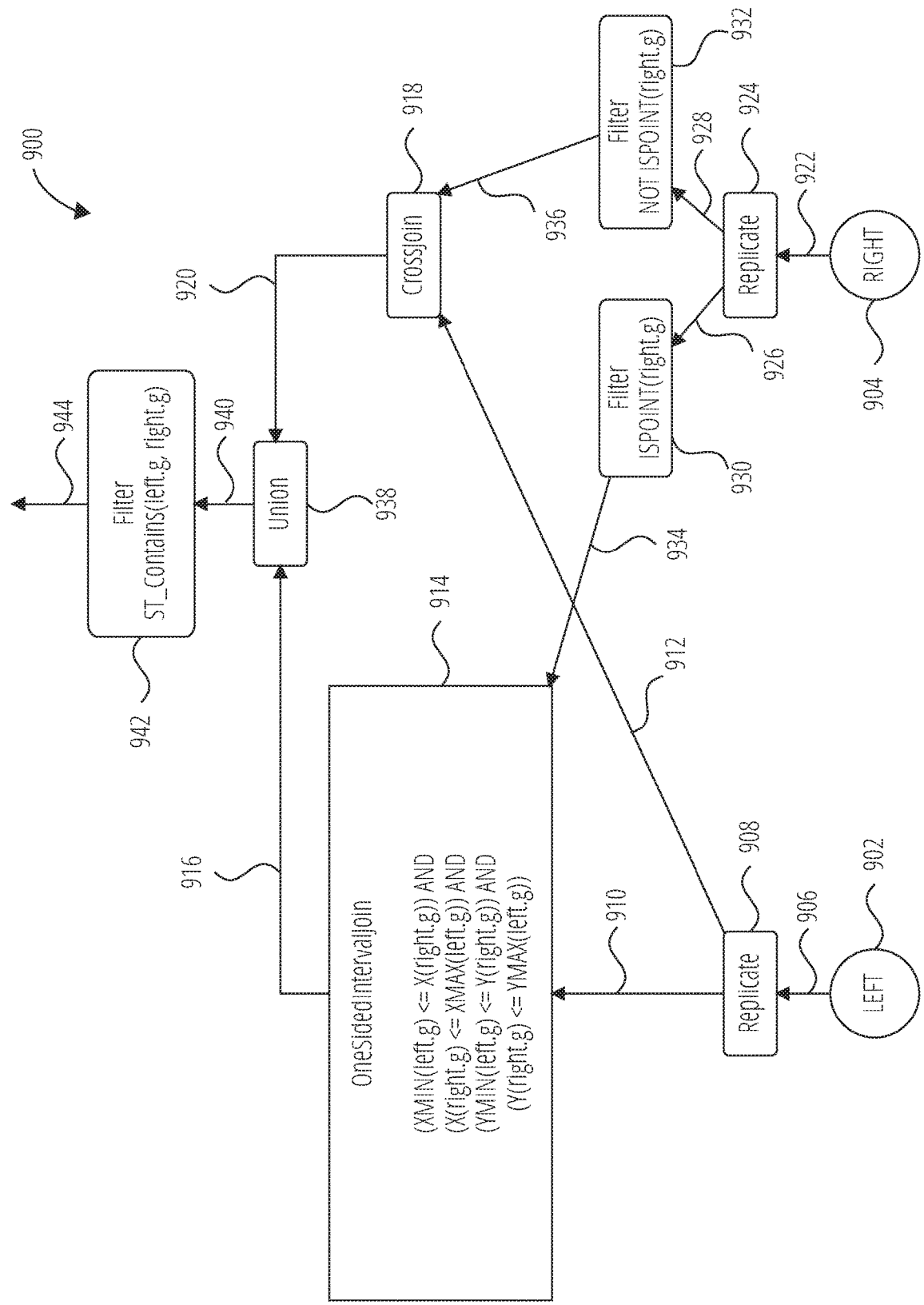
FIG. 9 illustrates a fourth example query-execution plan, in accordance with at least one embodiment.

FIG. 9 illustrates an example query-execution plan 900, in accordance with at least one embodiment. In an embodiment, the database manager 102 receives (at operation 202) query instructions that are or include the following:
SELECT expressions
FROM left
JOIN right
ON ST_Contains(left.g, right.g)

Responsive to receiving these query instructions, the database manager 102 generates (at operation 204) the example query-execution plan 900, including replacing (at operation 206) the geospatial-function predicate "ST_Contains(left.g, right.g)" with a one-sided interval join 914, and also including inserting (at operation 208) a geospatial-predicate filter 942 above the one-sided interval join 914. In some embodiments, a geospatial-predicate filter is inserted directly above a given interval join in a query-execution plan, as is the case with the query-execution plan 300 of FIG. 3, the query-execution plan 500 of FIG. 5, and the query-execution plan 700 of FIG. 7. In other embodiments, however, such as is shown in the query-execution plan 900 of FIG. 9, a geospatial-predicate filter (in this case the geospatial-predicate filter 942) is inserted above the one-sided interval join 914 but with at least one operator (in this case a union operator 938) in between the interval join and the geospatial-predicate filter.

As can be seen in FIG. 9, a left-side relation 902 is input as a replicate-operator input 906 into a replicate operator 908, which generates one extra copy of the left-side relation 902, and outputs a first left-side-relation instance 910 to the one-sided interval join 914, and also outputs a second left-side-relation instance 912 to a cross join 918. In an embodiment, both the first left-side-relation instance 910 and the second left-side-relation instance 912 include every row of the left-side relation 902. Such is also the case with respect to a right-side relation 904 and both a first right-side-relation instance 926 and a second right-side-relation instance 928 that are generated by a replicate operator 924 from a replicate-operator input 922, which is the right-side relation 904.

The first right-side-relation instance 926 is input into an ISPOINT filter 930, which applies the above-defined function ISPOINT to the geospatial object right.g in each row of the first right-side-relation instance 926, discarding those rows in which ISPOINT(right.g) returns FALSE—indicating that that particular right.g is not a point (or at least does not round to a point given the rounding settings of that particular implementation of the database platform 100), and forwarding those rows of the first right-side-relation instance 926 in which ISPOINT(right.g) returns TRUE—indicating that that particular right.g is a point (or at least rounds to a point given the rounding settings of that particular implementation of the database platform 100). The output of the ISPOINT filter 930 is represented as an ISPOINT-filter output 934, which is received as an input by the one-sided interval join 914.

The second right-side-relation instance 928 is input into a NOT-ISPOINT filter 932, which also applies the function ISPOINT to the geospatial object right.g in each row of the first right-side-relation instance 926, but then negates (i.e., flips) the Boolean value returned by the ISPOINT function. Thus, the NOT-ISPOINT filter 932 discards those rows of the second right-side-relation instance 928 in which ISPOINT(right.g) returns TRUE, and forwards those rows of the second right-side-relation instance 928 in which ISPOINT(right.g) returns FALSE. The output of the NOT-ISPOINT filter 932 is represented as a NOT-ISPOINT-filter output 936, which is received as an input by the cross join 918.

As described, the one-sided interval join 914 receives two inputs: the first left-side-relation instance 910 and the ISPOINT-filter output 934. Thus, in substance, the one-sided interval join 914 receives the entire left-side relation 902 and receives the subset of the right-side relation 904 in which right.g is a point (according, in at least one embodiment, to the function ISPOINT). In other embodiments, a given right.g can be determined by a given function to be a point based on a type value indicating, e.g., whether the particular geospatial object has type POINT, type LINESTRING, type POLYGON, and/or the like. This is another or a complementary implementation of ISPOINT—i.e., in at least one embodiment, the function ISPOINT(g) returns TRUE if (i) the above-described implementation of ISPOINT returns TRUE (i.e., g rounds or does not need to be rounded to a point) and/or (ii) g has a type property set to POINT. The one-sided interval join 914 then applies to those two inputs the following implied predicate, as shown in FIG. 9:

$(X\text{MIN}(left.g) <= X(right.g))$ AND $(X(right.g) <= X\text{MAX}(left.g))$ AND $(Y\text{MIN}(left.g) <= Y(right.g))$ AND $(Y(right.g) <= Y\text{MAX}(left.g))$ Pairs of rows—one originally from the left-side relation 902, the other originally from the right-side relation 904—that satisfy this predicate are forwarded to the union operator 938 as an interval-join output 916. It is also noted that, instead of the above predicate, the one-sided interval join 914 could equivalently apply the following simplified predicate:

$(X\mathrm{MIN}(\mathrm{left}.g){<}{=}X(\mathrm{right}.g){<}{=}X\mathrm{MAX}(\mathrm{left}.g))$ AND $(Y\mathrm{MIN}(\mathrm{left}.g){<}{=}Y(\mathrm{right}.g){<}{=}Y\mathrm{MAX}(\mathrm{left}.g))$ As shown in FIG. 9, the cross join 918 takes as its two inputs the second left-side-relation instance 912 and the NOT-ISPOINT-filter output 936. Thus, in substance, the cross join 918 receives the entirety of the left-side relation 902 and the subset of the right-side relation 904 in which right.g is determined to not be a point. The cross join 918 generates the Cartesian product of these two inputs, and outputs that Cartesian product to the union operator 938 as a cross-join output 920.

Thus, in this embodiment, the comparison that is done by the one-sided interval join 914 is between geospatial objects (points, linestrings, polygons, etc.) in the left-side relation 902 and points in the right-side relation 904. The non-points in the right-side relation 904 are then cross-joined with the left-side relation 902, and both the interval-join output 916 and the cross-join output 920 are inputs to the union operator 938, which keeps all rows from both of its inputs, and outputs this result as a union-operator output 940. The union-operator output 940 is then input into the geospatial-predicate filter 942, which implements the actual ST_Contains geospatial function, and outputs its result of applying that function as a geospatial-predicate-filter output 944. The approach shown in the query-execution plan 900 is more efficient than simply doing a cross join of the entirety of both the left-side relation 902 and the right-side relation 904 and then applying the geospatial-predicate filter 942. The extent to which it is more efficient may depend on the ratio of points to non-points in the right-side relation 904.

In other embodiments, the query-execution plan 900 can be utilized for geospatial-function predicates such as ST_Covers(left.g, right.g), ST_CoveredBy(right.g, left.g), and ST_Within(right.g, left.g). These are referred to herein at times as containment predicates, geospatial-function containment predicates, and the like. It is noted that FIG. 9 shows implied predicates for a multidimensional one-sided interval join. In embodiments in which a one-dimensional one-sided interval join is used, the predicate could be selected from the "Containment Predicates" subsection of the "Implied Predicates—One-Dimensional Interval Joins" section above. The architecture of the query-execution plan would be the same as that shown in connection with the query-execution plan 900 in FIG. 9.

Within-Distance Predicates

Figure 10:
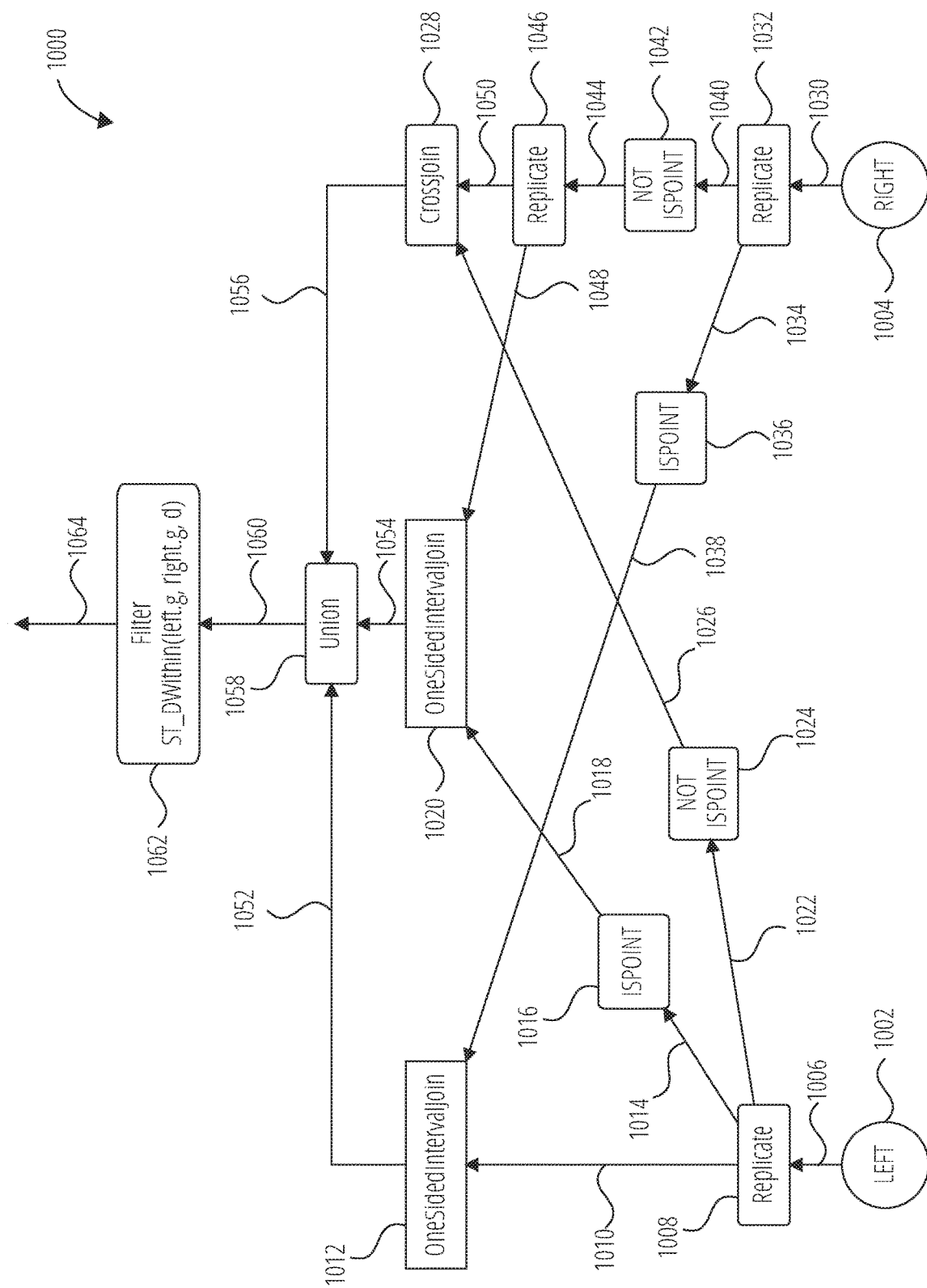
FIG. 10 illustrates a fifth example query-execution plan, in accordance with at least one embodiment.

FIG. 10 illustrates an example query-execution plan 1000, in accordance with at least one embodiment. In an embodiment, the database manager 102 receives (at operation 202) query instructions that are or include the following:
SELECT expressions
FROM left
JOIN right
ON ST_DWithin(left.g, right.g, d)
[or, equivalently, ON (ST_Distance(left.g, right.g)<=d)]

Responsive to receiving these query instructions, the database manager 102 generates (at operation 204) the example query-execution plan 1000, including replacing (at operation 206) the geospatial-function predicate "ST_DWithin(left.g, right.g, d)" with both a one-sided interval join 1012 and a one-sided interval join 1020, and also including inserting (at operation 208) a geospatial-predicate filter 1062 above (though not immediately above) the one-sided interval join 1012 and the one-sided interval join 1020.

In the embodiment that is depicted in FIG. 10, a left-side relation 1002 is input as a replicate-operator input 1006 to a replicate operator 1008, which makes two additional copies of the left-side relation 1002. The replicate operator 1008 outputs (i) a first left-side-relation instance 1010 to the one-sided interval join 1012, (ii) a second left-side-relation instance 1014 to an ISPOINT filter 1016, which in turn outputs, as an ISPOINT-filter output 1018 to the one-sided interval join 1020, only those rows in which ISPOINT (left.g) returns TRUE; and (iii) a third left-side-relation instance 1022 to a NOT-ISPOINT filter 1024, which outputs, as a NOT-ISPOINT-filter output 1026 to a cross join 1028, only those rows in which ISPOINT(left.g) returns FALSE.

On the right side, the right-side relation 1004 is input as a replicate-operator input 1030 to a replicate operator 1032, which makes one additional copy of the right-side relation 1004. The replicate operator 1032 outputs (i) a first right-side-relation instance 1034 to an ISPOINT filter 1036, which in turn outputs, as an ISPOINT-filter output 1038 to the one-sided interval join 1012, only those rows in which ISPOINT(right.g) returns TRUE and (ii) a second right-side-relation instance 1040 to a NOT-ISPOINT filter 1042, which in turn outputs, as a NOT-ISPOINT-filter output 1044 to a replicate operator 1046, only those rows in which ISPOINT (right.g) returns FALSE. The replicate operator 1046 makes one additional copy of the NOT-ISPOINT-filter output 1044, and outputs (i) a first right-side-relation non-point instance 1048 to the one-sided interval join 1020 and (ii) a second right-side-relation non-point instance 1050 to the cross join 1028.

As described, the one-sided interval join 1012 receives as its two inputs the first left-side-relation instance 1010 and the ISPOINT-filter output 1038. The one-sided interval join 1012 is therefore comparing geospatial objects such as points, linestrings, and polygons in the left-side relation 1002 with points in the right-side relation 1004. In at least one embodiment, the one-sided interval join 1012 applies the following implied predicate to those two inputs, with the geography-data-object join key of the first left-side-relation instance 1010 represented as left.g and with the geography-data-object join key of ISPOINT-filter output 1038 represented as right.g:

$(X\mathrm{MIN}(ST\_\mathrm{Buffer}(\mathrm{left}.g,\ d)){<}{=}X(\mathrm{right}.g))$ AND $(X(\mathrm{right}.g){<}{=}X\mathrm{MAX}(ST\_\mathrm{Buffer}(\mathrm{left}.g,\ d)))$ AND $(Y\mathrm{MIN}(ST\_\mathrm{Buffer}(\mathrm{left}.g,\ d)){<}{=}Y(\mathrm{right}.g))$ AND $(Y(\mathrm{right}.g){<}{=}Y\mathrm{MAX}(ST\_\mathrm{Buffer}(\mathrm{left}.g,\ d)))$ The one-sided interval join 1012 outputs only the row combinations, one from the first left-side-relation instance 1010 and the other from the ISPOINT-filter output 1038, that satisfy this implied predicate. This output is referred to here as a first interval-join output 1052, which is one of the three inputs to a union operator 1058. It is also noted that, instead of the above predicate, the one-sided interval join 1012 could equivalently apply the following simplified predicate:

$(X\mathrm{MIN}(ST\_\mathrm{Buffer}(\mathrm{left}.g,\ d)){<}{=}X(\mathrm{right}.g){<}{=}X\mathrm{MAX}(ST\_\mathrm{Buffer}(\mathrm{left}.g,\ d)))$ AND $(Y\mathrm{MIN}(ST\_\mathrm{Buffer}(\mathrm{left}.g,\ d)){<}{=}Y(\mathrm{right}.g){<}{=}Y\mathrm{MAX}(ST\_\mathrm{Buffer}(\mathrm{left}.g,\ d)))$ As described, the one-sided interval join 1020 receives as its two inputs the ISPOINT-filter output 1018 and the first right-side-relation non-point instance 1048. The one-sided interval join 1020 is therefore comparing points from the left-side relation 1002 with geospatial objects such as linestrings and polygons from the right-side relation 1004. In at least one embodiment, the one-sided interval join 1020 applies the following implied predicate to those two inputs, with the geography-data-object join key of the ISPOINT-filter output 1018 represented as left.g and with the geography-data-object join key of the first right-side-relation non-point instance 1048 represented as right.g:

$(X\text{MIN}(ST\_\text{Buffer}(right.g, d)) <= X(left.g))$ AND $(X(left.g) <= X\text{MAX}(ST\_\text{Buffer}(right.g, d)))$ AND $(Y\text{MIN}(ST\_\text{Buffer}(right.g, d)) <= Y(left.g))$ AND $(Y(left.g) <= Y\text{MAX}(ST\_\text{Buffer}(right.g, d)))$ The one-sided interval join 1020 outputs only the row combinations, one from the ISPOINT-filter output 1018 and the other from the first right-side-relation non-point instance 1048, that satisfy this implied predicate. This output is referred to here as a second interval-join output 1054, which is also one of the three inputs to the union operator 1058. It is also noted that, instead of the above predicate, the one-sided interval join 1020 could equivalently apply the following simplified predicate:

$(X\text{MIN}(ST\_\text{Buffer}(right.g, d)) <= X(left.g) <= X\text{MAX}(ST\_\text{Buffer}(right.g, d)))$

AND $(Y\text{MIN}(ST\_\text{Buffer}(right.g, d)) <= Y(left.g) <= Y\text{MAX}(ST\_\text{Buffer}(right.g, d)))$ The cross join 1028 takes as its two inputs the NOT-ISPOINT-filter output 1026 and the second right-side-relation non-point instance 1050. Thus, in substance, the cross join 1028 receives the non-points from the left-side relation 1002 and the non-points from the right-side relation 1004. The cross join 1028 generates the Cartesian product of these two inputs, and outputs that Cartesian product as a cross-join output 1056, which is the third of the three inputs to the union operator 1058.

The union operator 1058 keeps all rows from all three of its inputs, and outputs this result as a union-operator output 1060, which is then input into the geospatial-predicate filter 1062, which implements the actual ST_DWithin geospatial function. The geospatial-predicate filter 1062 outputs the result of applying that function as a geospatial-predicate-filter output 1064. This approach reflected in the query-execution plan 1000 of FIG. 10 is more efficient than simply doing a cross join of the entirety of both the left-side relation 1002 and the right-side relation 1004 and then applying the geospatial-predicate filter 1062. The extent to which it is more efficient may depend on the ratio of points to non-points in both the left-side relation 1002 and the right-side relation 1004.

As described above, in some embodiments of the present disclosure, metadata (also referred to as expression properties) is maintained by the database platform 100 in the metadata storage 110, where that metadata may include expression properties for respective rows, columns, and/or the like. Moreover, the present systems and methods are applicable to multiple domains other than those discussed herein. Some example such domains include Cartesian coordinates on the Earth's surface from a predefined origin (i.e., "eastings and northings") and also include Cartesian coordinates in a predefined plane, such as on a microchip or in a warehouse, as examples.

Figure 11:
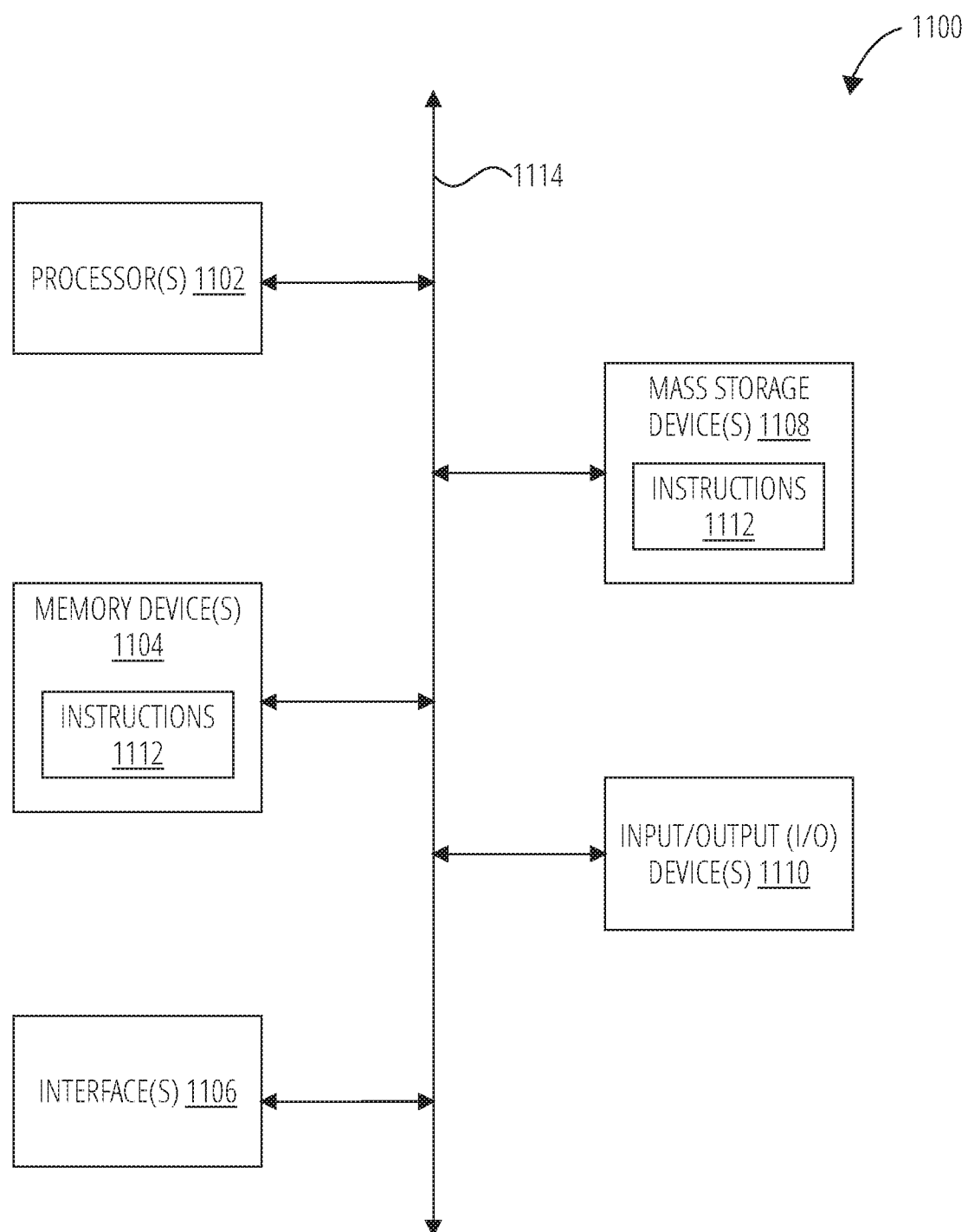
FIG. 11 illustrates an example computing device, in accordance with at least one embodiment.

FIG. 11 illustrates an example computing device 1100, in accordance with at least one embodiment. In some embodiments, the computing device 1100 is used to implement one or more of the systems and components discussed herein. Further, the computing device 1100 may interact with any of the systems and components described herein. Accordingly, the computing device 1100 may be used to perform various procedures and tasks, such as those discussed herein. The computing device 1100 can function as a server, a client, or any other computing entity. The computing device 1100 can be any of a wide variety of computing devices, such as a desktop computer, a notebook computer, a server computer, a handheld computer, a mobile device, a tablet, and/or the like.

In the depicted embodiment, the computing device 1100 includes one or more processor(s) 1102, one or more memory device(s) 1104, one or more interface(s) 1106, one or more mass storage device(s) 1108, and one or more input/output device(s) 1110, all of which are coupled to a bus 1114. The processor(s) 1102 include one or more processors or controllers that execute instructions stored in the memory device(s) 1104 and/or the mass storage device(s) 1108.

The memory device(s) 1104 can include various computer-storage media, such as volatile memory (e.g., random access memory (RAM)) and/or nonvolatile memory (e.g., read-only memory (ROM)). The memory device(s) 1104 may also include rewritable ROM, such as Flash memory. The processor(s) 1102 may also include various types of computer-storage media, such as cache memory.

The interface(s) 1106 may include various interfaces that allow the computing device 1100 to interact with other systems, devices, computing environments, and/or the like. Example interface(s) 1106 include any number of different network interfaces, such as interfaces to local area networks (LANs), wide area networks (WANs), wireless networks, the Internet, and/or the like.

The mass storage device(s) 1108 may include various computer-storage media, such as magnetic tapes, magnetic disks, optical disks, solid-state memory (e.g., Flash memory), and so forth. Various drives may also be included in the mass storage device(s) 1108 to enable reading from and/or writing to the various computer-storage media. The mass storage device(s) 1108 may include removable media and/or non-removable media.

The input/output device(s) 1110 may include various devices that allow data and/or other information to be input to and/or retrieved from the computing device 1100. Example input/output device(s) 1110 include cursor-control devices, keyboards, keypads, microphones, monitors or other display devices, speakers, printers, network interface cards, modems, lenses, CCDs or other image-capture devices, and the like.

The bus 1114 allows the processor(s) 1102, the memory device(s) 1104, the interface(s) 1106, the mass storage device(s) 1108, and the input/output device(s) 1110 to communicate with one another, as well as with other devices or components that may be coupled to the bus 1114. The bus 1114 represents one or more of several types of bus structures, such as a system bus, a PCI bus, an IEEE 1394 bus, a USB bus, and/or the like. In some examples, the bus 1114 includes one or more network connections.

For purposes of illustration, programs and other executable program components are shown herein as discrete blocks, although it is understood that such programs and components may reside at various times in different storage components of the computing device 1100 and are executed by the processor(s) 1102. Alternatively, the systems and procedures described herein can be implemented in hardware, or using a combination of hardware and software and/or firmware. For example, one or more application specific integrated circuits (ASICs) can be programmed to carry out one or more of the systems and procedures described herein.

Executable Instructions and Computer-Storage Medium/Media

The various memories may store one or more sets of instructions 1112 and data structures (e.g., software) embodying or utilized by any one or more of the methodologies or functions described herein. These instructions 1112, when executed by the processor(s) 1102, cause various operations to implement the disclosed embodiments.

As used herein, the terms "computer-storage medium (and media)," "machine-storage medium (and media)," and "device-storage medium (and media)" mean the same thing and may be used interchangeably in this disclosure. The terms refer to a single storage device or multiple storage devices and/or media (e.g., a centralized or distributed database, and/or associated caches and servers) that store executable instructions and/or data. The terms shall accordingly be taken to include, but not be limited to, solid-state memories as well as optical and magnetic media, including memory internal or external to processors. Specific examples of computer-storage media, machine-storage media, and/or device-storage media include non-volatile memory, include by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "computer-storage medium (and media)," "machine-storage medium (and media)," and "device-storage medium (and media)" specifically exclude carrier waves, modulated data signals, and other such media, at least some of which are covered under the term "transmission medium (and media)" discussed below.

Transmission Medium/Media

In various example embodiments, any network or portion of a network described herein may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi network, another type of network, or a combination of two or more such networks. For example, any network or portion of a network described herein may include a wireless or cellular network, and a utilized coupling may be a Code Division Multiple Access (CDMA) connection, a Global System for Mobile communications (GSM) connection, or another type of cellular or wireless coupling. In this example, a coupling may implement any of a variety of types of data-transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, and/or other data-transfer technology.

The instructions 1112 may be transmitted or received over a network using a transmission medium via a network interface device (e.g., a network interface component) and utilizing any one of a number of well-known transfer protocols (e.g., hypertext transfer protocol (HTTP)). Similarly, the instructions 1112 may be transmitted or received using a transmission medium via a coupling (e.g., a peer-to-peer coupling) to one or more devices. The terms "transmission medium (and media)" and "signal medium (and media)" mean the same thing and may be used interchangeably in this disclosure. The terms "transmission medium (and media)" and "signal medium (and media)" shall be taken to include any intangible medium that is capable of storing, encoding, or carrying the instructions 1112 for execution by the computing device 1100, and include digital or analog communications signals or other intangible media to facilitate communication of such software. Hence, the terms "transmission medium (and media)" and "signal medium (and media)" shall be taken to include any form of modulated data signal, carrier wave, and so forth. The term "modulated data signal" means a signal that has one or more of its characteristics set or changed in such a manner as to encode information in the signal.

Computer-Readable Medium/Media

The terms "computer-readable medium (and media)," "machine-readable medium (and media)," and "device-readable medium (and media)" mean the same thing and may be used interchangeably in this disclosure. The terms are defined to include both computer-storage media and transmission media. Thus, the terms include both storage devices and storage media as well as carrier waves and modulated data signals.

Examples of Embodiments

Following is a list of some examples of embodiments.

Example 1 is a method that includes receiving, by a database platform that includes at least one hardware processor, query instructions for a query on a database, the query instructions including instructions for a geospatial-function join, the geospatial-function join including a geospatial-function predicate; generating a query-execution plan based on the query instructions, the generating of the query-execution plan including (i) replacing the geospatial-function join with one or more interval joins, each interval join in the one or more interval joins including one or more implied predicates, each implied predicate being implied by the geospatial-function predicate and (ii) inserting, into the query-execution plan, a filter operator above the one or more interval joins, the filter operator applying the geospatial-function predicate; obtaining query results of the query, the obtaining of the query results comprising executing the query-execution plan; and returning the query results in response to the query.

Example 2 is the method of Example 1, where the query instructions include the query; and generating the query-execution plan based on the query instructions includes generating the query-execution plan based on the query.

Example 3 is the method of Example 1, where the query instructions include a preliminary query-execution plan; and generating the query-execution plan based on the query instructions includes modifying the preliminary query-execution plan.

Example 4 is the method of Example 1, where the query instructions include the query; the method further includes generating a preliminary query-execution plan based on the query, the preliminary query-execution plan including the geospatial-function predicate; and generating the query-execution plan based on the query instructions includes modifying the preliminary query-execution plan.

Example 5 is the method of any of the Examples 1-4, where the geospatial-function predicate includes a geospatial-function predicate from a set of one or more geospatial-function predicates.

Example 6 is the method of Example 5, where the set of one or more geospatial-function predicates includes one or more of a covers predicate, a covered-by predicate, a contains predicate, a within predicate, a within-distance predicate, and an intersects predicate.

Example 7 is the method of any of the Examples 1-6, where the geospatial-function join is a join of a left-side relation and a right-side relation; and the one or more interval joins includes a single two-sided interval join of the left-side relation and the right-side relation.

Example 8 is the method of any of the Examples 1-6, where the geospatial-function join includes a join of a left-side relation and a right-side relation; and the geospatial-function predicate includes a containment geospatial-function predicate for determining, for a given combination of (i) a current row of a first relation among the left-side relation and the right-side relation and (ii) a current row of a second relation among the left-side relation and the right-side relation, whether a geography-data-object join key of the first relation has a containment relationship with respect to a geography-data-object join key of the second relation.

Example 9 is the method of any of the Examples 1-6, where the geospatial-function join includes a join of a left-side relation and a right-side relation; and the geospatial-function predicate includes a within-distance geospatial-function predicate for determining, for a given combination of (i) a current row of a first relation among the left-side relation and the right-side relation and (ii) a current row of a second relation among the left-side relation and the right-side relation, whether a geography-data-object join key of the first relation is within a specified distance of a geography-data-object join key of the second relation.

Example 10 is the method of Example 1, where the geospatial-function join includes a join of a left-side relation and a right-side relation; and the geospatial-function predicate comprises a containment geospatial-function predicate.

Example 11 is a database platform that includes at least one processor; and one or more computer-storage media containing instructions executable by the at least one processor for causing the at least one processor to perform operations including: receiving query instructions for a query on a database, the query instructions including instructions for a geospatial-function join, the geospatial-function join including a geospatial-function predicate; generating a query-execution plan based on the query instructions, the generating of the query-execution plan including (i) replacing the geospatial-function join with one or more interval joins, each interval join in the one or more interval joins including one or more implied predicates, each implied predicate being implied by the geospatial-function predicate and (ii) inserting, into the query-execution plan, a filter operator above the one or more interval joins, the filter operator applying the geospatial-function predicate; obtaining query results of the query, the obtaining of the query results comprising executing the query-execution plan; and returning the query results in response to the query.

Example 12 is the database platform of Example 11, where the query instructions include the query; and generating the query-execution plan based on the query instructions includes generating the query-execution plan based on the query.

Example 13 is the database platform of Example 11, where the query instructions include a preliminary query-execution plan; and generating the query-execution plan based on the query instructions includes modifying the preliminary query-execution plan.

Example 14 is the database platform of Example 11, where the query instructions include the query; the operations further include generating a preliminary query-execution plan based on the query, the preliminary query-execution plan including the geospatial-function predicate; and generating the query-execution plan based on the query instructions includes modifying the preliminary query-execution plan.

Example 15 is the database platform of any of the Examples 11-14, where the geospatial-function predicate is a geospatial-function predicate from a set of one or more geospatial-function predicates.

Example 16 is the database platform of Example 15, where the set of one or more geospatial-function predicates includes one or more of a covers predicate, a covered-by predicate, a contains predicate, a within predicate, a within-distance predicate, and an intersects predicate.

Example 17 is the database platform of any of the Examples 11-16, where the geospatial-function join includes a join of a left-side relation and a right-side relation; and the one or more interval joins include a single two-sided interval join of the left-side relation and the right-side relation.

Example 18 is the database platform of any of the Examples 11-16, where the geospatial-function join includes a join of a left-side relation and a right-side relation; and the geospatial-function predicate includes a containment geospatial-function predicate for determining, for a given combination of (i) a current row of a first relation among the left-side relation and the right-side relation and (ii) a current row of a second relation among the left-side relation and the right-side relation, whether a geography-data-object join key of the first relation has a containment relationship with respect to a geography-data-object join key of the second relation.

Example 19 is the database platform of any of the Examples 11-16, where the geospatial-function join includes a join of a left-side relation and a right-side relation; and the geospatial-function predicate includes a within-distance geospatial-function predicate for determining, for a given combination of (i) a current row of a first relation among the left-side relation and the right-side relation and (ii) a current row of a second relation among the left-side relation and the right-side relation, whether a geography-data-object join key of the first relation is within a specified distance of a geography-data-object join key of the second relation.

Example 20 is the database platform of Example 11, where the geospatial-function join includes a join of a left-side relation and a right-side relation; and the geospatial-function predicate comprises a containment geospatial-function predicate.

Example 21 is one or more computer-storage media containing instructions executable by at least one processor for causing the at least one processor to perform operations including: receiving query instructions for a query on a database, the query instructions including instructions for a geospatial-function join, the geospatial-function join including a geospatial-function predicate; generating a query-execution plan based on the query instructions, the generating of the query-execution plan including (i) replacing the geospatial-function join with one or more interval joins, each interval join in the one or more interval joins including one or more implied predicates, each implied predicate being implied by the geospatial-function predicate and (ii) inserting, into the query-execution plan, a filter operator above the one or more interval joins, the filter operator applying the geospatial-function predicate; obtaining query results of the query, the obtaining of the query results comprising executing the query-execution plan; and returning the query results in response to the query.

Example 22 is the one or more computer-storage media of Example 21, where the query instructions include the query; and generating the query-execution plan based on the query instructions includes generating the query-execution plan based on the query.

Example 23 is the one or more computer-storage media of Example 21, where the query instructions include a preliminary query-execution plan; and generating the query-execution plan based on the query instructions includes modifying the preliminary query-execution plan.

Example 24 is the one or more computer-storage media of Example 21, where the query instructions include the query; the operations further include generating a preliminary query-execution plan based on the query, the preliminary query-execution plan including the geospatial-function predicate; and generating the query-execution plan based on the query instructions includes modifying the preliminary query-execution plan.

Example 25 is the one or more computer-storage media of any of the Examples 21-24, where the geospatial-function predicate is a geospatial-function predicate from a set of one or more geospatial-function predicates.

Example 26 is the one or more computer-storage media of Example 25, where the set of one or more geospatial-function predicates includes one or more of a covers predicate, a covered-by predicate, a contains predicate, a within predicate, a within-distance predicate, and an intersects predicate.

Example 27 is the one or more computer-storage media of any of the Examples 21-26, where the geospatial-function join includes a join of a left-side relation and a right-side relation; and the one or more interval joins include a single two-sided interval join of the left-side relation and the right-side relation.

Example 28 is the one or more computer-storage media of any of the Examples 21-26, where the geospatial-function join includes a join of a left-side relation and a right-side relation; and the geospatial-function predicate includes a containment geospatial-function predicate for determining, for a given combination of (i) a current row of a first relation among the left-side relation and the right-side relation and (ii) a current row of a second relation among the left-side relation and the right-side relation, whether a geography-data-object join key of the first relation has a containment relationship with respect to a geography-data-object join key of the second relation.

Example 29 is the one or more computer-storage media of any of the Examples 21-26, where the geospatial-function join includes a join of a left-side relation and a right-side relation; and the geospatial-function predicate includes a within-distance geospatial-function predicate for determining, for a given combination of (i) a current row of a first relation among the left-side relation and the right-side relation and (ii) a current row of a second relation among the left-side relation and the right-side relation, whether a geography-data-object join key of the first relation is within a specified distance of a geography-data-object join key of the second relation.

Example 30 is the one or more computer-storage media of any of Example 21, where the geospatial-function join includes a join of a left-side relation and a right-side relation; and the geospatial-function predicate comprises a containment geospatial-function predicate.

To promote an understanding of the principles of the present disclosure, various embodiments are illustrated in the drawings. The embodiments disclosed herein are not intended to be exhaustive or to limit the present disclosure to the precise forms that are disclosed in the above detailed description. Rather, the described embodiments have been selected so that others skilled in the art may utilize their teachings. Accordingly, no limitation of the scope of the present disclosure is thereby intended.

In any instances in this disclosure, including in the claims, in which numeric modifiers such as first, second, and third are used in reference to components, data (e.g., values, identifiers, parameters, and/or the like), and/or any other elements, such use of such modifiers is not intended to denote or dictate any specific or required order of the elements that are referenced in this manner. Rather, any such use of such modifiers is intended to assist the reader in distinguishing elements from one another, and should not be interpreted as insisting upon any particular order or carrying any other significance, unless such an order or other significance is clearly and affirmatively explained herein.

Moreover, consistent with the fact that the entities and arrangements that are described herein, including the entities and arrangements that are depicted in and described in connection with the drawings, are presented as examples and not by way of limitation, any and all statements or other indications as to what a particular drawing "depicts," what a particular element or entity in a particular drawing or otherwise mentioned in this disclosure "is" or "has," and any and all similar statements that are not explicitly self-qualifying by way of a clause such as "In at least one embodiment," and that could therefore be read in isolation and out of context as absolute and thus as a limitation on all embodiments, can only properly be read as being constructively qualified by such a clause. It is for reasons akin to brevity and clarity of presentation that this implied qualifying clause is not repeated ad nauseum in this disclosure.

In the present disclosure, various terminology is used in accordance with provided definitions. Furthermore, it is noted in connection with the definitions set out herein that the defined terms and phrases as used herein include the provided definitions along with any general and conventional understandings of the meaning of the respective terms and phrases.

It is further noted that, as used in this specification and in the appended claims, the singular forms "a," "an," and "the" include plural referents unless the context clearly dictates otherwise.

As used herein, the terms "comprising," "including," "containing," "characterized by," and grammatical equivalents thereof are inclusive, open-ended terms that do not exclude additional, unrecited elements, method steps, or the like.

Many of the functional units described in this specification may be implemented as one or more components, which is a term used to more particularly emphasize their implementation independence. For example, a component may be implemented as a hardware circuit including custom very large-scale integration (VLSI) circuits or gate arrays, off-the-shelf semiconductors such as logic chips, transistors, and/or other discrete components. A component may also be implemented in programmable hardware devices such as field programmable gate arrays (FPGAs), programmable array logic, programmable logic devices, and/or the like.

Components may also be implemented in software for execution on various types of hardware (e.g., by various types of processors). An identified component of executable code may, for instance, include one or more physical or logical blocks of computer instructions, which may, for instance, be organized as an object, a procedure, or a function. Nevertheless, the executable instructions of an identified component need not be physically located together but may include disparate instructions stored in different locations that, when joined logically together, make up the component and achieve the stated purpose for the component.

Indeed, a component of executable code may be a single instruction, or many instructions, and may be distributed over several different code segments, among different programs, and across several memory devices. Similarly, operational data may be identified and illustrated herein within components and may be embodied in any suitable form and organized within any suitable type of data structure. The operational data may be collected as a single data set or may be distributed over different locations including over different storage devices, and may exist, at least partially, merely as electronic signals on a system or network. The components may be passive or active, including agents operable to perform desired functions.

Reference throughout this specification to "an example" means that a feature, structure, or characteristic described in connection with the example is included in at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another but are to be considered as separate and autonomous representations of the present disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive.

Those having skill in the art will appreciate that many changes may be made to the details of the above-described embodiments without departing from the underlying principles of the disclosure. The scope of the present disclosure should, therefore, be determined only by the claims.

What is claimed is:

1. A method comprising:
    receiving, by a database platform comprising at least one hardware processor, query instructions for a query on a database, the query instructions comprising instructions for a geospatial-function join that comprises a geospatial-function predicate;
    generating, by the database platform, a query-execution plan based on the query instructions, the generating of the query-execution plan comprising:
        replacing the geospatial-function join with exactly one join, the exactly one join being an interval join having an interval-join predicate implied by the geospatial-function predicate; and
        inserting, into the query-execution plan, a filter operator to apply the geospatial-function predicate to an output of the interval join;
    obtaining, by the database platform, query results of the query, the obtaining of the query results comprising executing the query-execution plan; and
    returning, by the database platform, the query results in response to the query.

2. The method of claim 1, wherein the interval join comprises a multidimensional two-sided interval join.

3. The method of claim 2, wherein the geospatial-function predicate comprises a containment predicate.

4. The method of claim 2, wherein the geospatial-function predicate comprises an intersection predicate.

5. The method of claim 2, wherein the geospatial-function predicate comprises a within-distance predicate.

6. The method of claim 1, wherein the interval join comprises a multidimensional one-sided interval join.

7. The method of claim 6, wherein the geospatial-function predicate comprises a containment predicate.

8. The method of claim 1, wherein the interval join comprises a one-dimensional two-sided interval join.

9. The method of claim 1, wherein the interval join comprises a one-dimensional one-sided interval join.

10. The method of claim 1, wherein:
    the geospatial-function join applies the geospatial-function predicate to a first relation and a second relation, the first relation comprising a first join key, the second relation comprising a second join key;
    the first join key is a multi-point geography data object;
    the second join key is a single-point geography data object; and
    the interval join comprises a multi-dimensional one-sided interval join.

11. A database platform comprising:
    at least one hardware processor; and
    one or more computer-storage media containing instructions executable by the at least one hardware processor for causing the at least one hardware processor to perform operations comprising:

receiving query instructions for a query on a database, the query instructions comprising instructions for a geospatial-function join that comprises a geospatial-function predicate;

generating a query-execution plan based on the query instructions, the generating of the query-execution plan comprising:

replacing the geospatial-function join with exactly one join, the exactly one join being an interval join having an interval-join predicate implied by the geospatial-function predicate; and inserting, into the query-execution plan, a filter operator to apply the geospatial-function predicate to an output of the single interval join;

obtaining query results of the query, the obtaining of the query results comprising executing the query-execution plan; and returning the query results in response to the query.

12. The database platform of claim 11, wherein the interval join comprises a multidimensional two-sided interval join.

13. The database platform of claim 12, wherein the geospatial-function predicate comprises a containment predicate.

14. The database platform of claim 12, wherein the geospatial-function predicate comprises an intersection predicate.

15. The database platform of claim 12, wherein the geospatial-function predicate comprises a within-distance predicate.

16. The database platform of claim 11, wherein the interval join comprises a multidimensional one-sided interval join.

17. The database platform of claim 16, wherein the geospatial-function predicate comprises a containment predicate.

18. The database platform of claim 11, wherein the interval join comprises a one-dimensional two-sided interval join.

19. The database platform of claim 11, wherein the interval join comprises a one-dimensional one-sided interval join.

20. The database platform of claim 11, wherein:

the geospatial-function join applies the geospatial-function predicate to a first relation and a second relation, the first relation comprising a first join key, the second relation comprising a second join key;

the first join key is a multi-point geography data object;

the second join key is a single-point geography data object; and the interval join comprises a multi-dimensional one-sided interval join.

21. One or more computer-storage media containing instructions executable by at least one hardware processor for causing the at least one hardware processor to perform operations comprising:

receiving query instructions for a query on a database, the query instructions comprising instructions for a geospatial-function join that comprises a geospatial-function predicate;

generating a query-execution plan based on the query instructions, the generating of the query-execution plan comprising:

replacing the geospatial-function join with exactly one join being an interval join having an interval-join predicate implied by the geospatial-function predicate; and inserting, into the query-execution plan, a filter operator to apply the geospatial-function predicate to an output of the single interval join;

obtaining query results of the query, the obtaining of the query results comprising executing the query-execution plan; and returning the query results in response to the query.

22. The one or more computer-storage media of claim 21, wherein the interval join comprises a multidimensional two-sided interval join.

23. The one or more computer-storage media of claim 22, wherein the geospatial-function predicate comprises a containment predicate.

24. The one or more computer-storage media of claim 22, wherein the geospatial-function predicate comprises an intersection predicate.

25. The one or more computer-storage media of claim 22, wherein the geospatial-function predicate comprises a within-distance predicate.

26. The one or more computer-storage media of claim 21, wherein the interval join comprises a multidimensional one-sided interval join.

27. The one or more computer-storage media of claim 26, wherein the geospatial-function predicate comprises a containment predicate.

28. The one or more computer-storage media of claim 21, wherein the interval join comprises a one-dimensional two-sided interval join.

29. The one or more computer-storage media of claim 21, wherein the interval join comprises a one-dimensional one-sided interval join.

30. The one or more computer-storage media of claim 21, wherein:

the geospatial-function join applies the geospatial-function predicate to a first relation and a second relation, the first relation comprising a first join key, the second relation comprising a second join key;

the first join key is a multi-point geography data object;

the second join key is a single-point geography data object; and the interval join comprises a multi-dimensional one-sided interval join.

* * * * *

UNITED STATES PATENT AND TRADEMARK OFFICE
CERTIFICATE OF CORRECTION

| | | |
|---|---|---|
| PATENT NO. | : 11,036,739 B1 | Page 1 of 1 |
| APPLICATION NO. | : 16/944049 | |
| DATED | : June 15, 2021 | |
| INVENTOR(S) | : Adams et al. | |

It is certified that error appears in the above-identified patent and that said Letters Patent is hereby corrected as shown below:

In the Claims

In Column 44, Line 8, Claim 21, after "with", insert --exactly one join, the--

Signed and Sealed this
Twelfth Day of April, 2022

Drew Hirshfeld
*Performing the Functions and Duties of the*
*Under Secretary of Commerce for Intellectual Property and*
*Director of the United States Patent and Trademark Office*